US010154529B2

(12) United States Patent
Liu et al.

(10) Patent No.: US 10,154,529 B2
(45) Date of Patent: Dec. 11, 2018

(54) METHOD AND APPARATUS FOR CONNECTING PERIPHERAL DEVICES

(71) Applicant: Tencent Technology (Shenzhen) Company Limited, Shenzhen (CN)

(72) Inventors: Jinhai Liu, Shenzhen (CN); Chenglin Liu, Shenzhen (CN); Zhan Shu, Shenzhen (CN); Xiangyao Lin, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 444 days.

(21) Appl. No.: 14/992,835

(22) Filed: Jan. 11, 2016

(65) Prior Publication Data

US 2016/0128124 A1 May 5, 2016

Related U.S. Application Data

(63) Continuation of application No. PCT/CN2015/070325, filed on Jan. 8, 2015.

(30) Foreign Application Priority Data

Mar. 12, 2014 (CN) .......................... 2014 1 0091096

(51) Int. Cl.
*G06F 15/16* (2006.01)
*H04W 76/14* (2018.01)
(Continued)

(52) U.S. Cl.
CPC ............ *H04W 76/14* (2018.02); *H04L 67/10* (2013.01); *H04L 67/306* (2013.01); *H04W 4/21* (2018.02); *H04W 4/80* (2018.02); *H04W 48/16* (2013.01)

(58) Field of Classification Search
CPC ......... H04W 76/14; H04W 4/21; H04W 4/80; H04W 76/023; H04W 4/206; H04W 4/008; H04W 48/16; H04L 67/10; H04L 67/306
See application file for complete search history.

(56) References Cited

U.S. PATENT DOCUMENTS

2007/0274271 A1* 11/2007 Jones .................... H04W 8/005
370/338
2009/0160694 A1* 6/2009 Di Flora ................. H04L 51/38
341/176
(Continued)

FOREIGN PATENT DOCUMENTS

CN 102056328 A 5/2011
CN 102711057 A 10/2012
(Continued)

OTHER PUBLICATIONS

Tencent Technology, ISRWO, PCT/CN2015/070325, Mar. 31, 2015, 8 pgs.
Tencent Technology, IPRP, PCT/CN2015/070325, Sep. 13, 2016, 6 pgs.

*Primary Examiner* — John B Walsh
(74) *Attorney, Agent, or Firm* — Morgan, Lewis & Bockius LLP

(57) ABSTRACT

A method and apparatus for connecting peripheral devices are disclosed. The method is performed at an electronic device having one or more processors and memory, and includes: scanning, through a user interface of a social networking application, an image containing encoded information associated with a first peripheral device that provides a first wireless communication interface; retrieving, based on the encoded information, a first identity information item of the first peripheral device from a server hosting a social networking platform associated with the social networking application; and in accordance with the retrieved first iden- (Continued)

tity information item, establishing a wireless connection between the electronic device and the first peripheral device via the first wireless communication interface of the first peripheral device.

17 Claims, 15 Drawing Sheets

(51) Int. Cl.
*H04W 4/21* (2018.01)
*H04W 4/80* (2018.01)
*H04W 48/16* (2009.01)
*H04L 29/08* (2006.01)

(56) References Cited

U.S. PATENT DOCUMENTS

2013/0134212 A1* 5/2013 Chang ................ G06F 11/0742
                                                        235/375
2014/0372371 A1* 12/2014 McCann ........... G06F 17/30289
                                                        707/609

FOREIGN PATENT DOCUMENTS

| | | |
|---|---|---|
| CN | 102868593 A | 1/2013 |
| CN | 103067052 A | 4/2013 |
| CN | 103369714 A | 10/2013 |
| CN | 103488528 A | 1/2014 |
| CN | 104144470 A | 11/2014 |
| DE | 102012003889 A1 | 8/2013 |
| EP | 2381658 A | 10/2011 |

* cited by examiner

Electronic Device 104

(D)

Establishing more than one wireless connection with more than one peripheral device from the multiple peripheral devices;

preparing a message from the social network user account; and {The message may be a text message, or an audio message.} selecting a respective one of the sub-contacts for sending the message to a corresponding peripheral device of the selected respective one of the sub-contacts; and sending the message to the server for conversion into a device-readable message for the corresponding peripheral device of the selected respective one of the sub-contacts.

~518

Before sending the message to the server for conversion, further comprising:

detecting whether a wireless connection between the electronic device and the corresponding selected peripheral device is active.

~520

(E)

Selecting one of the sub-contacts for sending a message to a corresponding peripheral device;

selecting a message input format based on the corresponding selected peripheral device; and preparing a message in the message input format to be sent to the corresponding selected peripheral device.

METHOD AND APPARATUS FOR CONNECTING PERIPHERAL DEVICES

PRIORITY CLAIM AND RELATED APPLICATIONS

This application is a continuation application of PCT Patent Application No. PCT/CN2015/070325, entitled "METHOD AND APPARATUS FOR CONNECTING PERIPHERAL DEVICES" filed on Jan., 8, 2015, which claims priority to Chinese Patent Application No. 201410091096.7, entitled "METHOD AND CLIENT TERMINAL FOR MAKING A BLUETOOTH CONNECTION" filed on Mar. 12, 2014, both of which are incorporated by reference in their entirety.

TECHNICAL FIELD

The present application relates to the field of Internet technologies, and in particular, to a method and device for connecting devices over an interface of a user application, in particular, an interface of a social network application.

BACKGROUND

A Bluetooth technology is a type of wireless communication technology that has found wide application in devices, and can implement wireless short-distance communication to improve efficiency and convenience for short-distance communication. It is desired to have an accurate and efficient method and device for establishing the wireless connections.

SUMMARY

In existing Internet technologies, to establish a Bluetooth connection, a user needs to: (1) scan for nearby Bluetooth devices using a device associated with the user; (2) select the Bluetooth device in a system settings interface to connect to the selected Bluetooth device; (3) receive a connection password from an external source; (4) manually input the received connection password to the settings interface; and (5) send, by the device, the connection password to the selected Bluetooth device, so that the Bluetooth device can verify the connection password. When the verification is confirmed, a Bluetooth connection can be established between the Bluetooth device and the device associated with the user.

In the foregoing Bluetooth connection process, because the user is required to manually input a connection password, the efficiency of a Bluetooth connection process is low. In addition, the process of manually inputting the connection password by the user may generate mistakes, which results in even lower Bluetooth connection efficiency.

The embodiments of the present disclosure provide a method and device for establishing a wireless connection between devices (e.g., peripheral devices, machines, appliances, equipment, etc.) on a social network platform via the user interface of a user application, such as a social network application associated with the social network platform.

In some embodiments, a method for connecting devices is performed at an electronic device (e.g., electronic device 104, FIGS. 1 and 3) having one or more processors and memory. The method includes: scanning, through a user interface of a social networking application, an image containing encoded information associated with a first peripheral device that provides a first wireless communication interface; retrieving, based on the encoded information, a first identity information item of the first peripheral device from a server hosting a social networking platform associated with the social networking application; and in accordance with the retrieved first identity information item, establishing a wireless connection between the electronic device and the first peripheral device via the first wireless communication interface of the first peripheral device.

In some embodiments, an electronic device (e.g., electronic device 104, FIGS. 1 and 3), includes one or more processors, and memory storing one or more programs for execution by the one or more processors, the one or more programs include instructions for performing the operations of any of the methods described herein.

In some embodiments, a non-transitory computer readable storage medium storing one or more programs, the one or more programs comprising instructions, which, when executed by an electronic device (e.g., electronic device 104, FIGS. 1 and 3), cause the electronic device to perform the operations of any of the methods described herein. In some embodiments, an electronic device (e.g., electronic device 104, FIGS. 1 and 3) includes means for performing, or controlling performance of, the operations of any of the methods described herein.

Various advantages of the present application are apparent in light of the descriptions below.

BRIEF DESCRIPTION OF THE DRAWINGS

For a better understanding of the aforementioned aspects of the application as well as additional aspects and embodiments thereof, reference should be made to the Detailed Description below, in conjunction with the following drawings in which like reference numerals refer to corresponding parts throughout the figures.

FIGS. 5A-5D are flowchart diagrams illustrating a method for connecting devices in accordance with some embodiments.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide an understanding of the subject matter presented herein. But it will be apparent to one skilled in the art that the subject matter may be practiced without these specific details or in alternative suitable manners. In other instances, well-known methods, procedures, components, and circuits have not been described in detail so as not to unnecessarily obscure aspects of the embodiments.

The technical solutions of the present application will be described in the following with reference to the accompanying drawings. It is obvious that embodiments to be described are only a part rather than all of the embodiments of the present application. All other embodiments obtained by a person of ordinary skill in the art based on the embodiments of the present application without creative efforts shall fall within the protection scope of the present application.

In some embodiments of the present application, an electronic device may be any electronic device, for example, an instant messaging electronic device, a game electronic device, a social platform electronic device, an email electronic device, an audio/video electronic device, which can implement a Bluetooth interface. In some embodiments, the electronic device in the embodiments of the present application may be any electronic device capable of implementing wireless connection technology, such as a Bluetooth technology. In some embodiments, the electronic device includes an intelligent device with a Bluetooth function, such as a tablet computer, a mobile phone, an electronic reader, a remote control, a personal computer (PC), a notebook computer, a notebook computer, on-board equipment, a network television or a wearable device. In some embodiments, a graphic code includes, but is not limited to, a two-dimensional code and a three-dimensional code.

Figure 1:
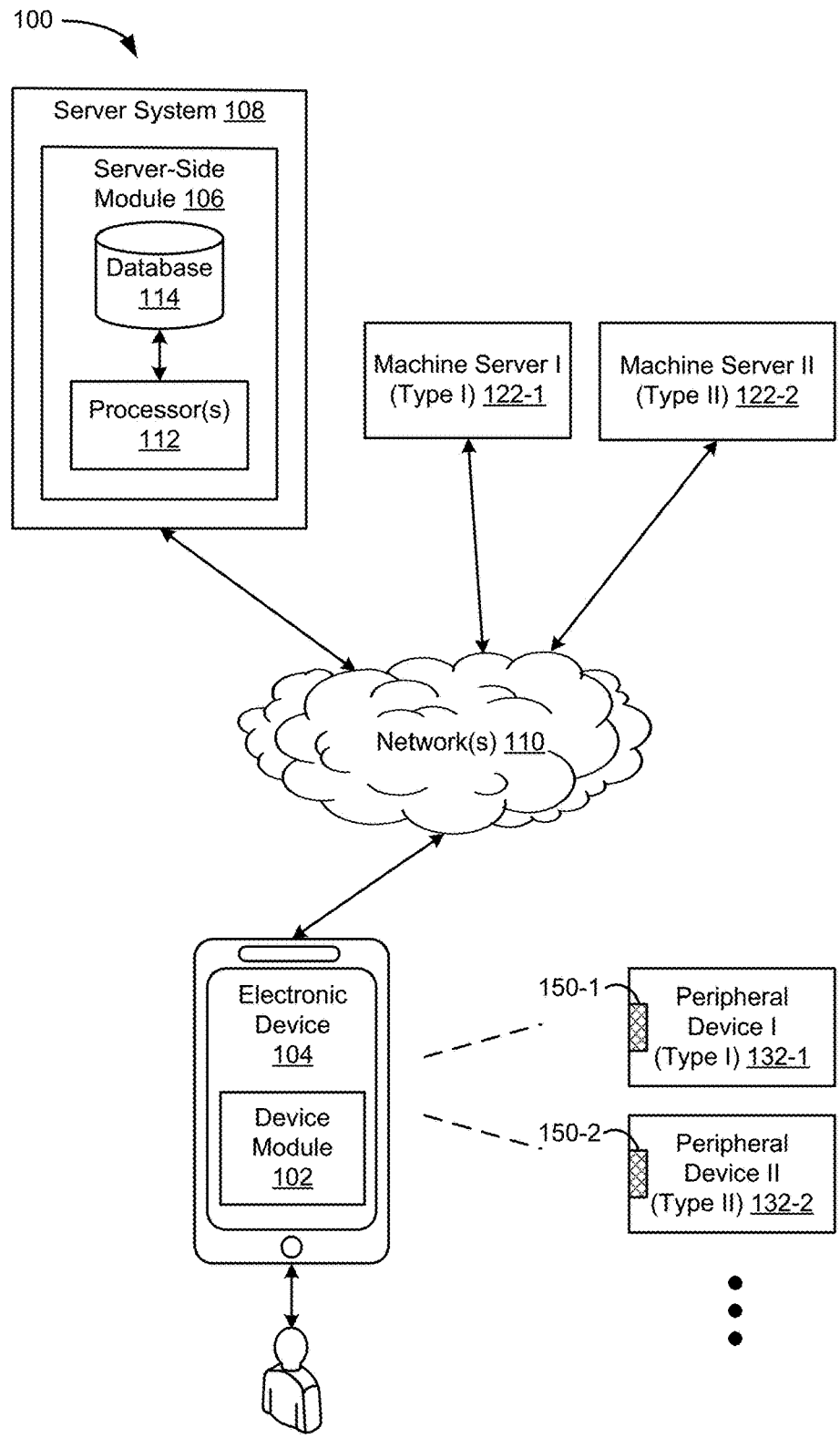
FIG. 1 is a block diagram illustrating exemplary embodiments of server-electronic device environments in accordance with some embodiments.

FIG. 1 is a block diagram illustrating a server-electronic device environment 100 in accordance with some embodiments. In some embodiments, server-electronic device environment 100 includes device module 102 executed on an electronic device 104, and server-side module 106 executed on a server system 108 (e.g., for hosting a social network platform), machine servers 122-1, 122-2 (e.g., for performing machine command conversions) corresponding to different device types (e.g., peripheral device type I 132-1 and type II 132-2 respectively), and communication network(s) 110 for interconnecting these components. Device module 102 provides electronic device-side functionalities (e.g., instant messaging, and social networking services) and communication with server-side module 106. Server-side module 106 provides server-side functionalities (e.g., instant messaging, and social networking services) for any number of electronic device modules 102 each residing on a respective electronic device 104.

In some embodiments, server-side module 106 includes one or more processors 112, one or more databases 114, an I/O interfaces (not shown) to one or more electronic devices 104 and machine servers 122. I/O interface to one or more electronic devices 104 facilitates the processing of input and output associated with the electronic devices for server-side module 106. One or more processors 112 obtain requests for performing account operations from one or more electronic devices 104, process the requests, identify usage data associated with the user account on the one or more electronic devices, verify the account information on the one or more electronic devices, and send the account verification results in response to the requests to device modules 102 of one or more electronic devices 104. The database 114 stores various information, including but not limited to, account information associated with each user account, device information associated with each device account, and usage data associated with each user account or device account on a certain electronic device. The database 114 may also store a plurality of record entries relevant to the activities of respective user accounts or respective device accounts. I/O interface to one or more machine servers 122 facilitates communication with one or more machine servers (e.g., associated with machine manufacturer websites, machine command conversion services, and/or other processing services).

Examples of electronic device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communication (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

In some embodiments as shown in FIG. 1, electronic device 104 is capable of communicating wirelessly with one or more peripheral devices, such as peripheral device 132-1 of a first type (type I), and/or peripheral device 132-2 of a second type (type II). In some embodiments, peripheral device 132 may be any electronic device capable of implementing wireless connection technology, such as a Bluetooth technology. In some embodiments, the wireless communication interface can be provided by a transceiver microchip 150 embedded or attached to peripheral device 132.

In some embodiments, the peripheral device is an intelligent device with a Bluetooth function, such as a tablet computer, a mobile phone, an electronic reader, a remote control, a personal computer (PC), headphones, a sound player, a notebook computer, a notebook computer, on-board equipment, a network television or a wearable device. In some embodiments, peripheral device 132 is equipment that is capable of implementing wireless connection technology (e.g., a Bluetooth technology), such as an ultrasound scanner, an x-ray machine, a vehicle, etc.

Server-electronic device environments shown in FIG. 1 include both a electronic device-side portion (e.g., device module 102) and a server-side portion (e.g., server-side module 106). In some embodiments, data processing is implemented as a standalone application installed on electronic device 104. In addition, the division of functionalities between the electronic device and server portions of electronic device environment data processing can vary in different embodiments. For example, in some embodiments, device module 102 is a thin-electronic device that provides only user-facing input and output processing functions, and delegates all other data processing functionalities to a back-end server (e.g., server system 108).

Figure 2:
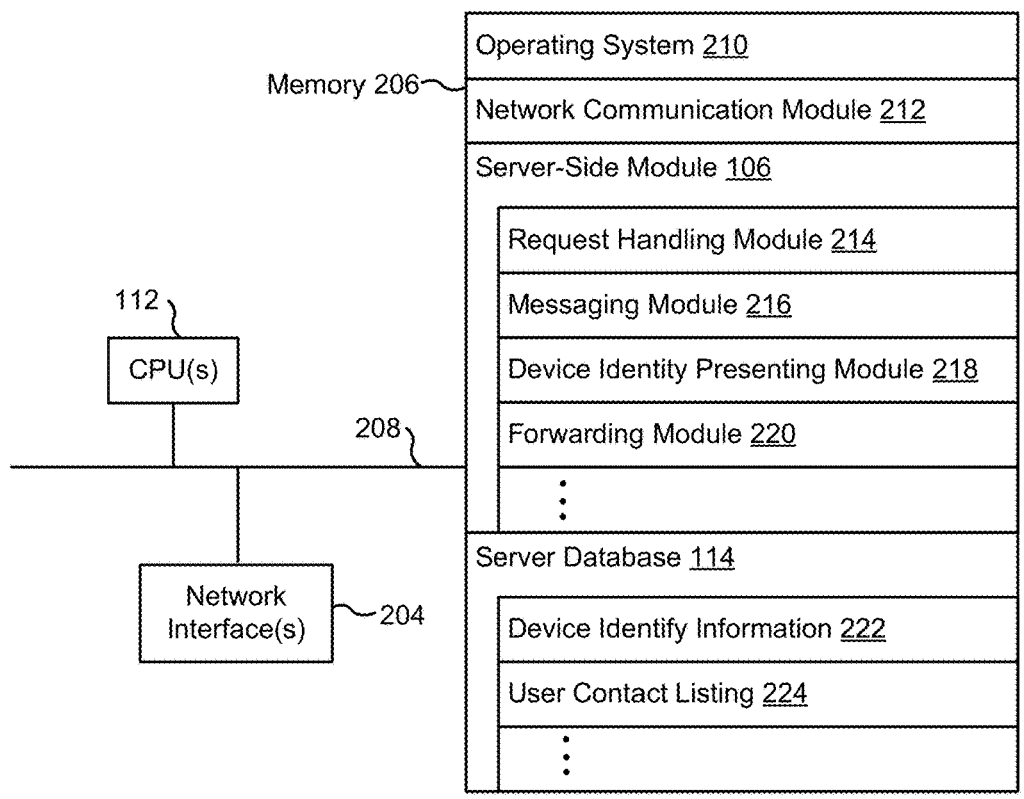
FIG. 2 is a block diagram of a server system in accordance with some embodiments.

FIG. 2 is a block diagram illustrating a server system 108 in accordance with some embodiments. Server system 108, typically, includes one or more processing units (CPUs) 112, one or more network interfaces 204 (e.g., including I/O interface), memory 206, and one or more communication buses 208 for interconnecting these components (sometimes called a chipset).

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:
- operating system 210 including procedures for handling various basic system services and for performing hardware dependent tasks;
- network communication module 212 for connecting server system 108 to other computing devices (e.g., electronic devices 104 and/or machine servers 122) connected to one or more networks 110 via one or more network interfaces 204 (wired or wireless);
- server-side module 106, which provides server-side data processing (e.g., device identity information, instant messaging, and social networking services), includes, but is not limited to:
  - request handling module 214 for handling and responding to various requests sent from electronic device 104, including requests for device identity information;
  - messaging module 216 for managing and routing messages sent between user accounts and device contacts of the social networking platform;
  - device identity presenting module 218 for identifying and presenting respective device identity information in response to requests from electronic device 104; and
  - forwarding module 220 for forwarding chat messages and other information received from electronic device 104 to corresponding machine servers 122 for conversion, and for forwarding machine commands converted by respective machine servers 122 to electronic device 104; and
- one or more server database 114 storing data for the social networking platform, including but not limited to:
  - device identity information 222 storing peripheral device information, such as MAC address of Bluetooth device 150 associated with the corresponding peripheral device, respective device types of corresponding peripheral devices, and respective machine servers for converting machine commands readable by the corresponding peripheral devices; and
  - user contact listing 224 storing a listing of social network contacts, including human contact(s) and device contact(s), for a corresponding user account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
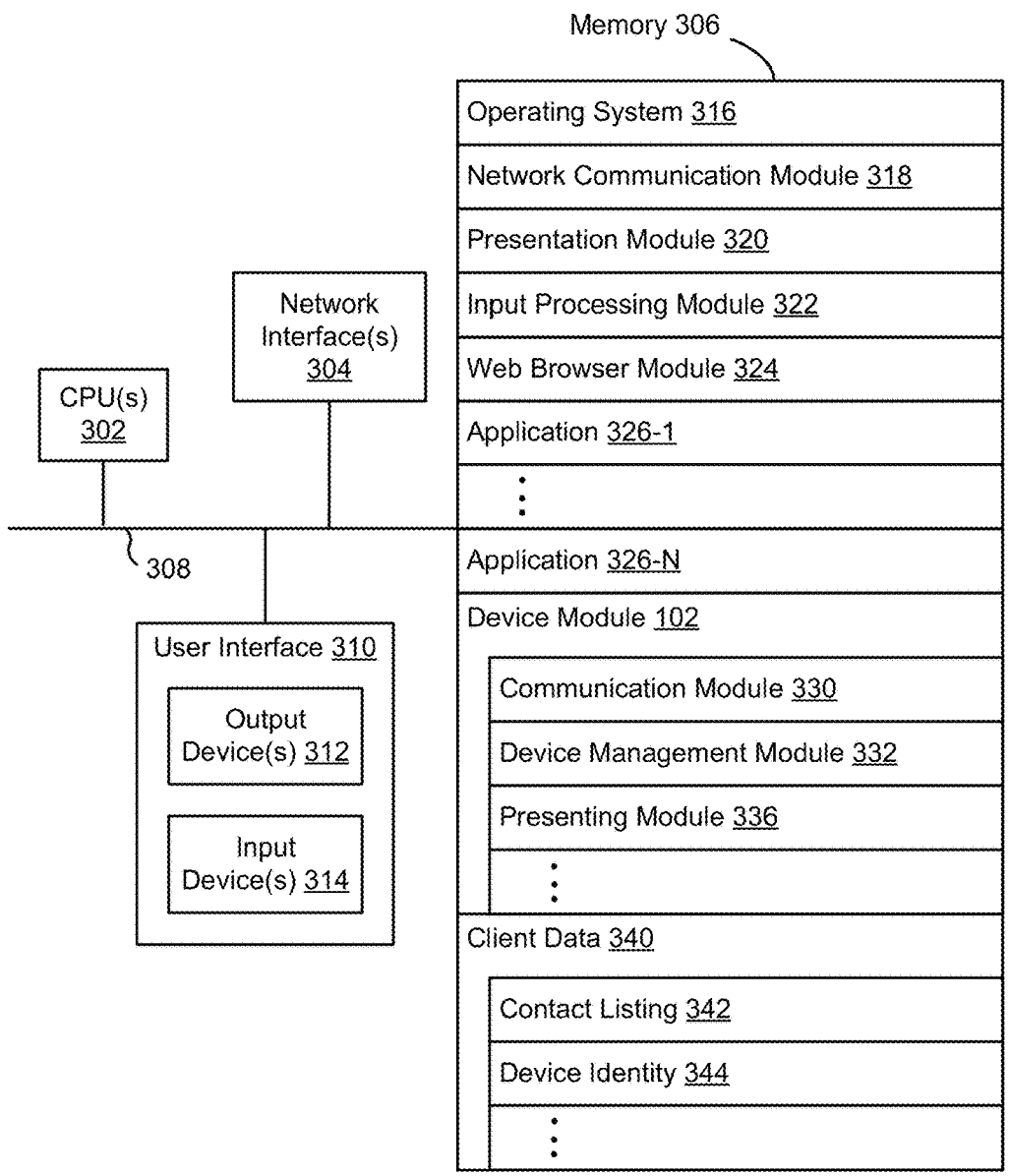
FIG. 3 is a block diagram illustrating an electronic device in accordance with some embodiments.

FIG. 3 is a block diagram illustrating a representative electronic device 104 in accordance with some embodiments. Electronic device 104, typically, includes one or more processing units (CPUs) 302, one or more network interfaces 304, memory 306, and one or more communication buses 308 for interconnecting these components (sometimes called a chipset). Electronic device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a camera, a gesture capturing camera, or other input buttons or controls. In some embodiments, user interface 310 of electronic device 104 includes suitable device(s) that are capable of scanning graphical images. Furthermore, some electronic devices 104 use a microphone and voice recognition or a camera and gesture recognition to supplement or replace the keyboard.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:
- operating system 316 including procedures for handling various basic system services and for performing hardware dependent tasks;
- network communication module 318 for connecting electronic device 104 to other computing devices (e.g., server system 108 and machine servers 122) connected to one or more networks 110 via one or more network interfaces 304 (wired or wireless);
- presentation module 320 for enabling presentation of information (e.g., a user interface for a social networking platform, widget, webpage, game, and/or application, audio and/or video content, text, etc.) at electronic device 104 via one or more output devices 312 (e.g., displays, speakers, etc.) associated with user interface 310;
- input processing module 322 for detecting one or more user inputs or interactions from one of the one or more input devices 314 and interpreting the detected input or interaction;
- web browser module 324 for navigating, requesting (e.g., via HTTP), and displaying websites and web pages thereof;

one or more applications 326-1-326-N for execution by electronic device 104 (e.g., games, application marketplaces, payment platforms, and/or other applications); and device module 102, which provides electronic device-side data processing and functionalities for the social networking platform, including but not limited to:

communication module 330 for providing social network platform, sending messages to and receiving messages from other users of the social networking platform (e.g., instant messaging, group chat, message board, message/news feed, and the like);

device management module 332 for managing connections between electronic device 104 and one or more peripheral devices 132, including managing device contact(s) for a user account;

presenting module 336 for presenting the identity information received from server system 108 to a corresponding peripheral device for verification; and electronic device data 340 storing data associated with the social networking platform, including, but is not limited to: contact listing 342 storing a listing of social network contacts, including human contact(s) and device contact(s), for a user account; and device identity 344 storing device identity information of various peripheral.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of server system 108 are performed by electronic device 104, and the corresponding sub-modules of these functions may be located within electronic device 104 rather than server system 108. In some embodiments, at least some of the functions of electronic device 104 are performed by server system 108, and the corresponding sub-modules of these functions may be located within server system 108 rather than electronic device 104. Electronic device 104 and server system 108 shown in FIGS. 2 and 3, respectively, are merely illustrative, and different configurations of the modules for implementing the functions described herein are possible in various embodiments.

Figure 4A:
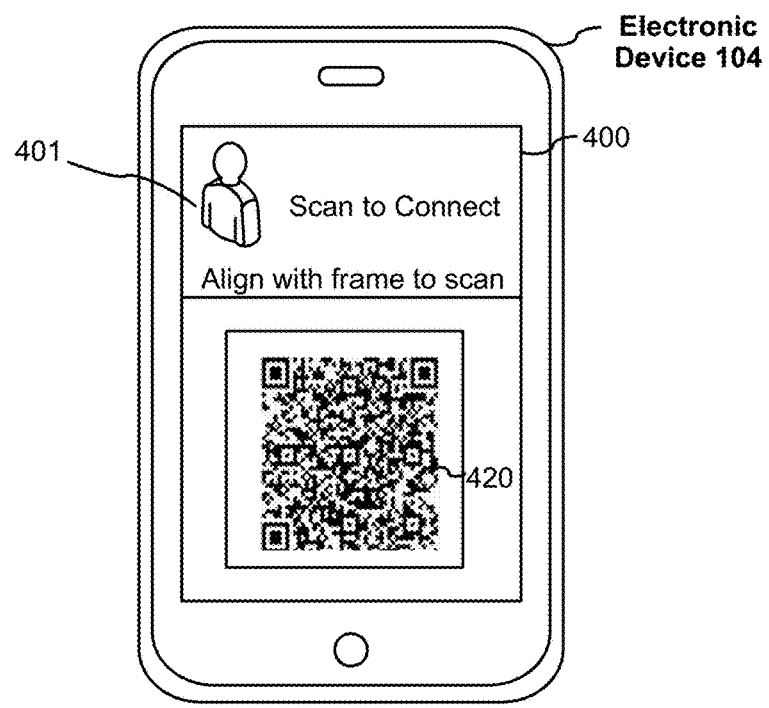
FIGS. 4A-4E illustrate exemplary user interfaces for connecting devices in accordance with some embodiments.

FIGS. 4A-4E are exemplary user interfaces for connecting devices in accordance with some embodiments. FIG. 4A is an exemplary user interface for using electronic device 104 to scan image 420 using a user application, e.g., a social network application for a social networking platform 400 associated with social network user account 401. Image 420 contains encoded information associated with a first peripheral device. In some implementations, image 420 is displayed on the first peripheral device, shown on a tag attached to the first peripheral device, or displayed in any suitable manner to be scanned by electronic device 104. The format of image 420 can be a QR code as shown in FIG. 4A, a barcode, or any other suitable forms.

Figure 4B:
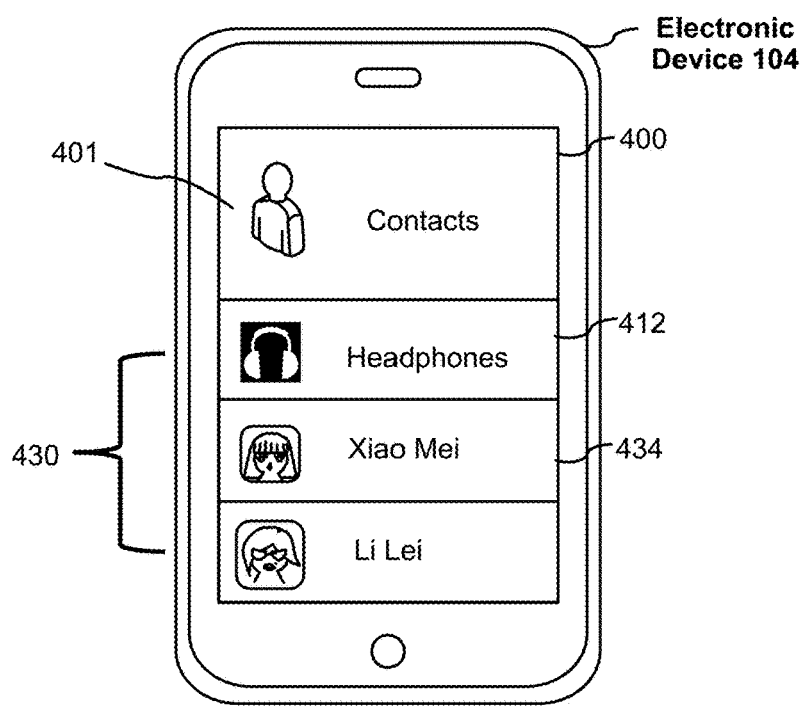

FIG. 4B shows an exemplary embodiment of a listing 430 of social network contacts for social network user account 401 on social networking platform 400. In some implementations, listing 430 includes a human contact 434 (e.g., Xiao Mei), and a device contact 412 (e.g., headphones).

Figure 4C:
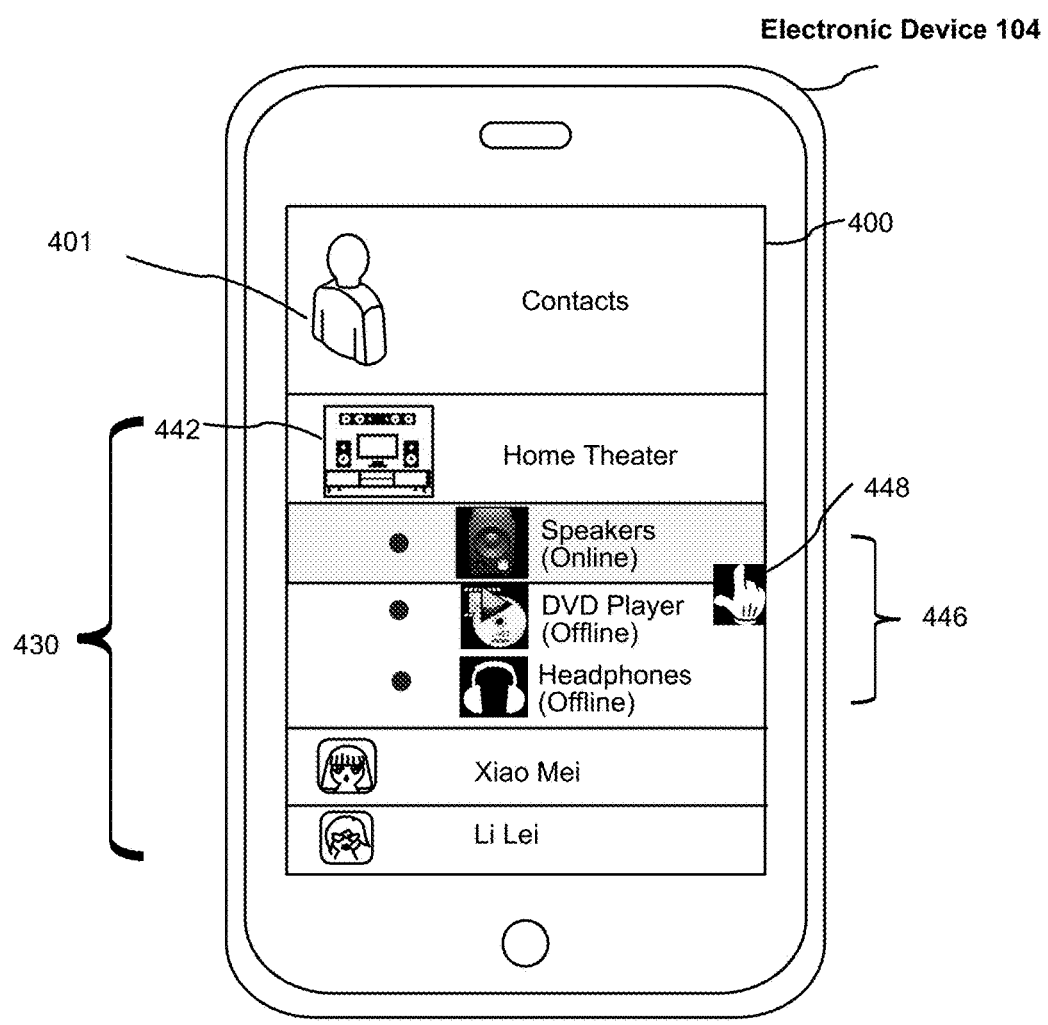

FIG. 4C shows an exemplary embodiment of a listing 430 of social network contacts for social network user account 401. In some implementations, device contact 442 (e.g., "Home Theater") of listing 430 includes a listing of sub-contacts 446 (e.g., "Speakers", "DVD Player", and "Headphones") displayed under device contact 442 on social networking platform 400. Each sub-contacts 446 correspond to a respective one of multiple peripheral devices, such as speakers, DVD player, and headphones.

In some implementations, the connection status between electronic device 104 and a respective sub-contact is also displayed. For example, when electronic device 104 is currently connected to the speakers, the connection status is marked as "Online" next to the sub-contact corresponding to the speakers. When electronic device 104 is not connected to a peripheral device (e.g., DVD player), however electronic device 104 can recognize the device information associated with this sub-contact, the sub-contact is marked as "Offline".

In some implementations as shown in FIG. 4C, electronic device 104 displays respective avatars representing the multiple peripheral devices. In some implementations, when the user selects (448) a particular peripheral device from the listing of sub-contacts, a connection is established between electronic device 104 and the particular peripheral device selected by the user.

Figure 4D:
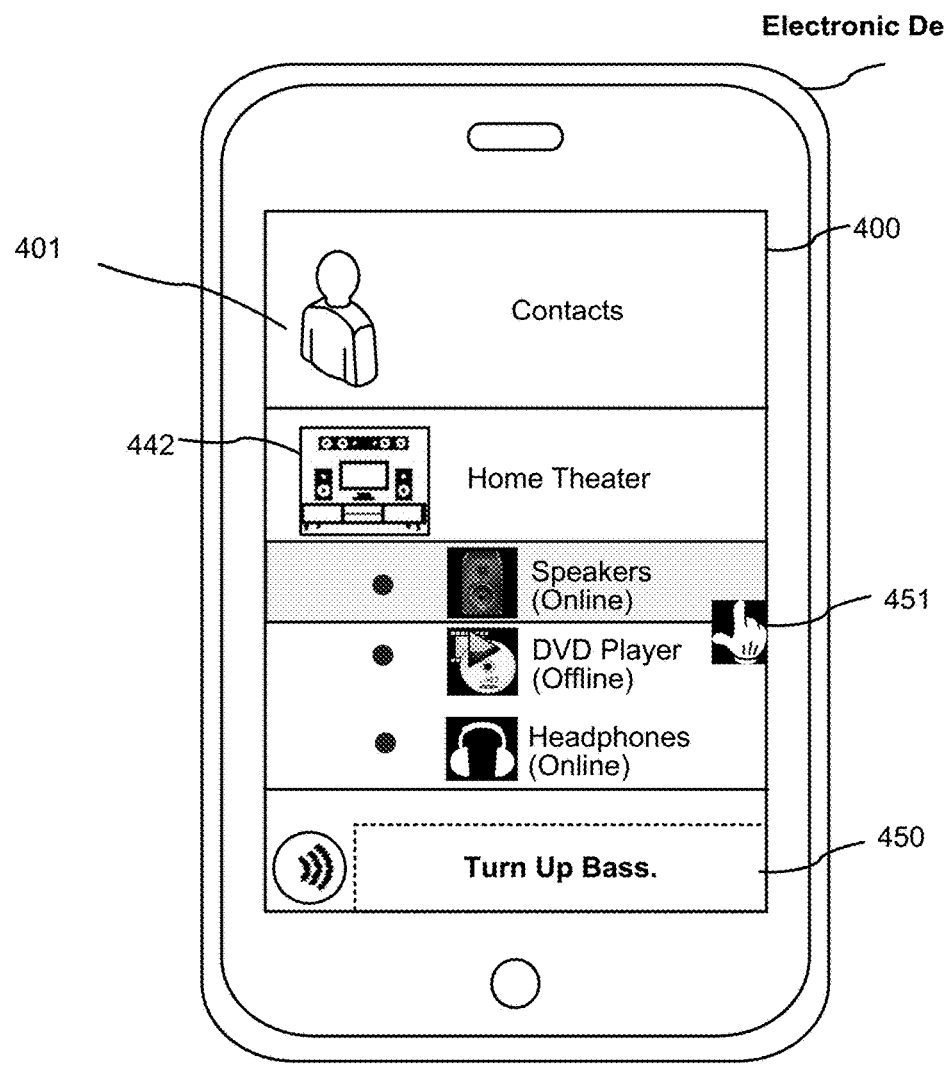

FIG. 4D is an exemplary embodiment of a chat interface on social networking platform 400. In some implementations, after a connection is established between electronic device 104 and a peripheral device (e.g., the speakers), the user prepares a chat message 450 for the connected peripheral device. After finish typing chat message 450, the user selects (451) a sub-contact from the contact listing for sending chat message 450 to the peripheral device (e.g., the speakers) corresponding to the selected sub-contact. Chat message 450 will be sent to server 108 for conversion into a device-readable message for the speakers.

Figure 4E:
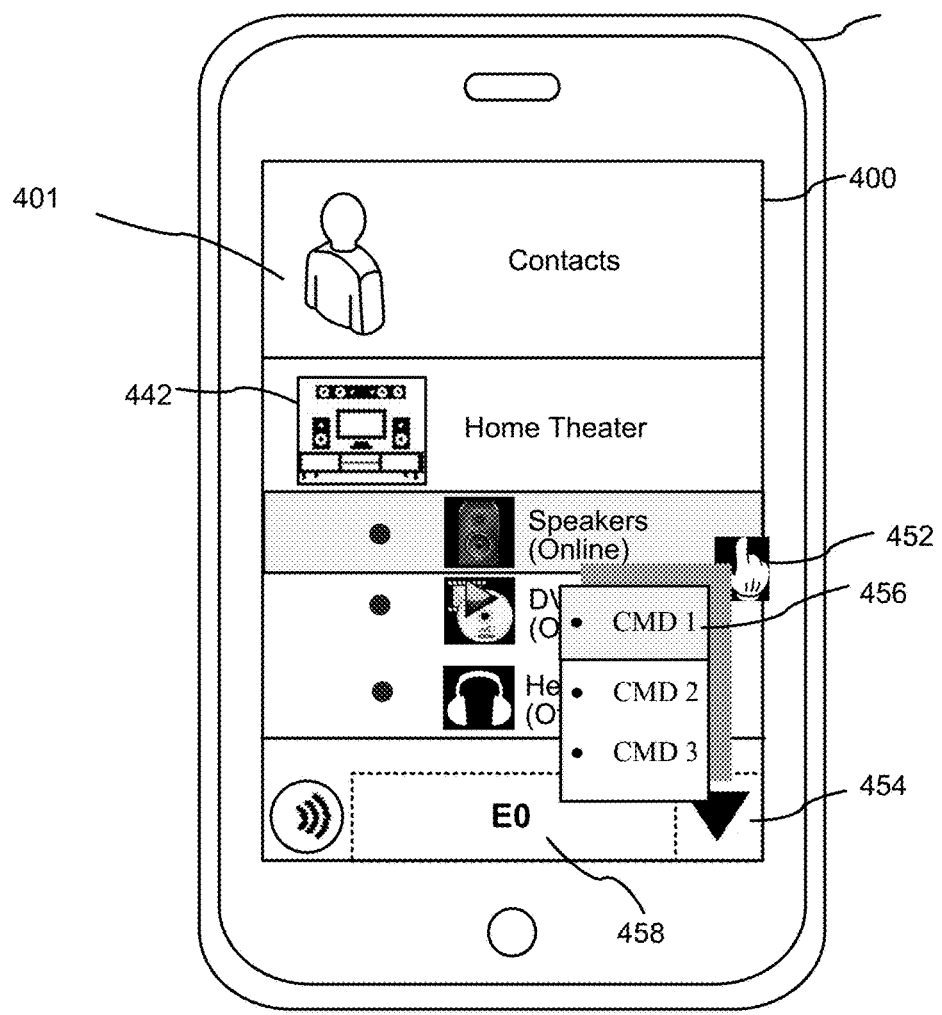

FIG. 4E is another exemplary embodiment of a chat interface on social networking platform 400. In some implementations, the user first selects (452) a sub-contact for sending a chat message to the peripheral device (e.g., the speakers). The user then presses (454) an icon for displaying a scroll-down bar to choose a message input format 456 (e.g., "CMD 1") based on the corresponding selected peripheral device. The user then prepares a message 458 in the message input format (e.g., "E0" for disabling echo) to be sent to the speakers. Further detailed embodiments of FIGS. 4A-4E are illustrated in conjunction with method 500 of FIGS. 5A-5D.

FIGS. 5A-5D illustrate a flowchart diagram of a method 500 for connecting devices in accordance with some embodiments. In some embodiments, method 500 is performed by electronic device 104 with one or more processors and memory. For example, in some embodiments, method 500 is performed by electronic device 104 (FIGS. 1 and 3) or a component thereof. In some embodiments, method 500 is governed by instructions that are stored in a non-transitory computer readable storage medium and the instructions are executed by one or more processors of the electronic device. Optional operations are indicated by dashed lines (e.g., boxes with dashed-line borders).

In method 500, an electronic device scans (502), through a user interface (e.g., user interface 400, FIGS. 4A-4E) of a social networking application, an image (e.g., image 420, FIG. 4A) containing encoded information associated with a first peripheral device that provides a first wireless communication interface.

In some implementations, the image may be displayed on the first peripheral device (e.g., peripheral device 132-1, FIG. 1), or may be included (e.g., displayed, printed) on a tag attached to the first peripheral device. In some implementations, the wireless communication interface can be provided by a transceiver microchip (e.g., transceiver microchip 150, FIG. 1) embedded or attached to the first peripheral device. The communication interface can be implemented in accordance with the protocol of the Bluetooth® technology. In some embodiments, the user interface for scanning the image is the same as the social networking platform. In some embodiments, the user interface for scanning the image is a separate interface from the social networking platform, such as an interface overlaying the platform, or another interface distinct from the platform in the social networking application.

The electronic device retrieves (504), based on the encoded information, a first identity information item of the first peripheral device from a server (e.g., server system 108, FIGS. 1-2) hosting a social networking platform associated with the social networking application.

In some embodiments, the electronic device sends the encoded information to the server. The server decodes the encoded information to obtain the first identity information item, and sends the first identity information item to the electronic device. In some embodiments, the first identity information item includes one of: device identity of the first peripheral device, MAC address of the wireless communication device (e.g. microchip 150, FIG. 1) of the first peripheral device, and other suitable information. In some implementations, the server obtains the first identity information item from the server's own database (e.g., device identity information 222, FIG. 2). In some implementations, the server obtains the first identity information from an external server associated with manufacturer of the wireless communication device and/or the first peripheral device (e.g., machine server 122, FIG. 1).

Conventionally, the user needs to have the information needed to identify the peripheral device handy, and let the electronic device scan the nearby neighborhood to find the first peripheral device. Then the user is required to manually enter the information in a Bluetooth connection setup user interface. In the present application, the device information is automatically retrieved from the server, and the user does not have to leave the social networking application interface to connect to the peripheral device via Bluetooth. This could provide a more efficient and user-friendly process for connecting devices in the social networking application.

Figure 5A:
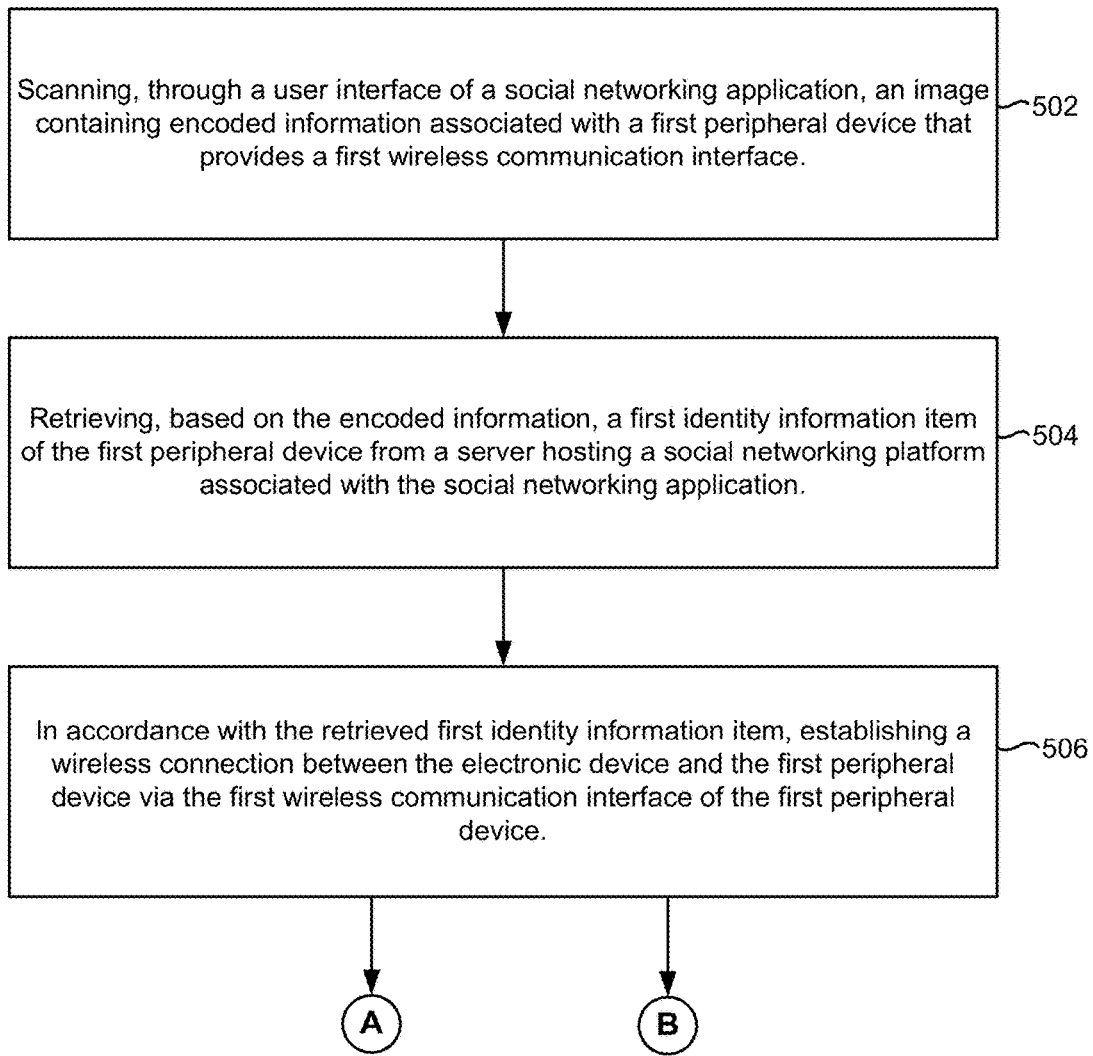

Still referring to FIG. 5A, in accordance with the retrieved first identity information item, the electronic device establishes (506) a wireless connection between the electronic device and the first peripheral device via the first wireless communication interface (e.g. microchip 150, FIG. 1) of the first peripheral device.

In some embodiments, establishing the wireless connection comprises: sending the retrieved first identity information item to the first peripheral device for verification; and in accordance with a confirmation of the verification, establishing the wireless connection between the electronic device and the first peripheral device. The first identity information item can be sent to the first peripheral device in the normal way before the Bluetooth connection is established. Once the connection is established, the communication would be secure.

In some embodiments, the first identity information item can be encrypted in accordance with a key that has been pre-established for the first peripheral device, such that the first peripheral device would be able to decode the first identity information item before verifying the first identity information item.

By establishing the wireless connection between the electronic device and the first peripheral device this way, the user does not need to leave the social network application user interface, and does not have to go through the cumbersome Bluetooth pairing process. In some embodiments, instead of the social networking application, other user applications in which usage of a peripheral device may be desired can also implement this wireless connection setup method.

Figure 5B:
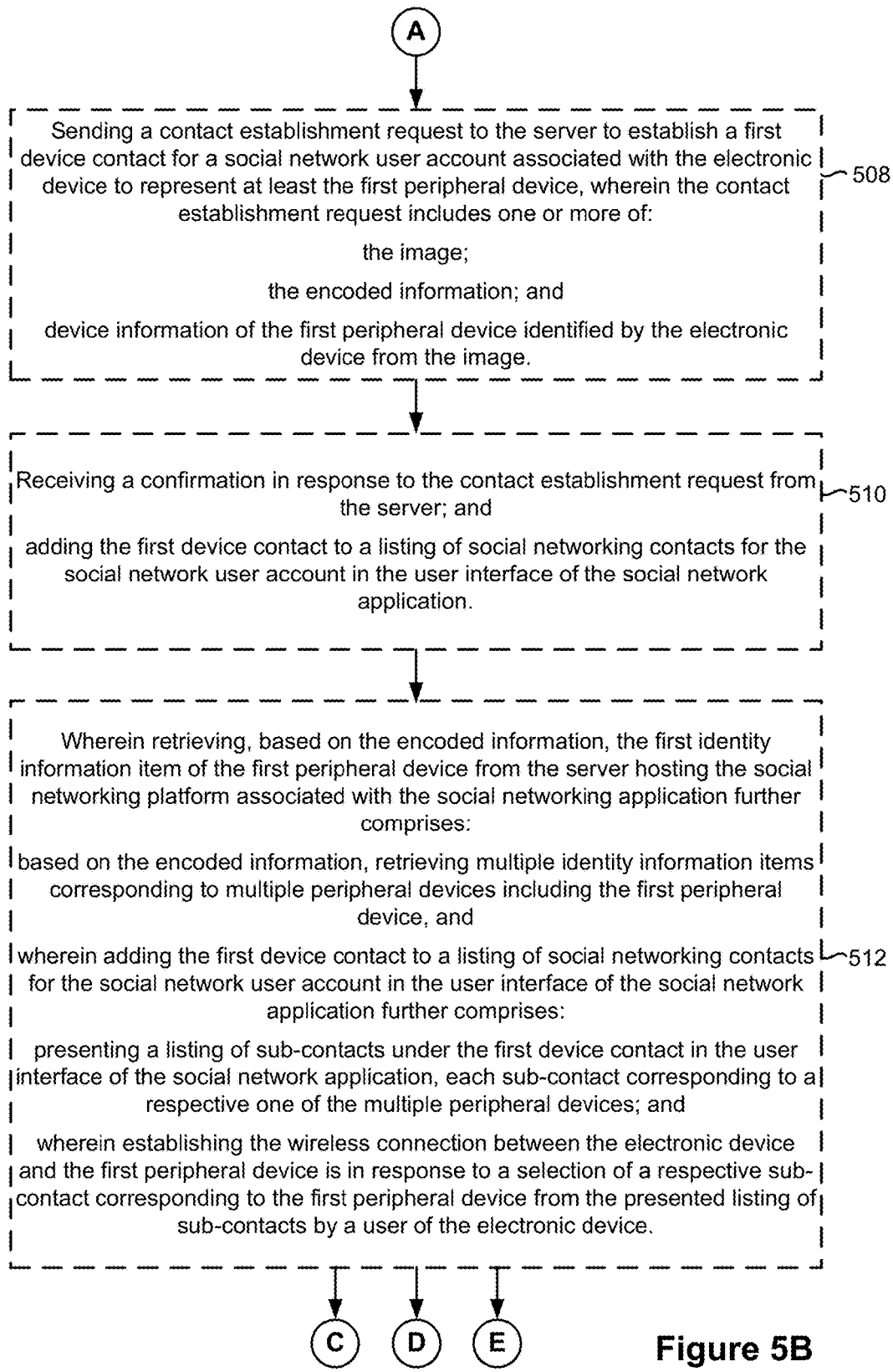

Referring to FIG. 5B, in some implementations, the electronic device sends (508) a contact establishment request to the server to establish a first device contact for a social network user account associated with the electronic device to represent at least the first peripheral device. In some embodiments, the contact establishment request includes one or more of: the image; the encoded information; and device information of the first peripheral device identified by the electronic device from the image.

In some implementations, the contact establishment request is sent after retrieving the identity information item from the server, and the contact establishment request further includes the retrieved first identity information item.

In some implementations, the contact establishment request is sent before retrieving the identity information item from the server. In such implementations, the electronic device may be able to identify some information of the first peripheral device after scanning the image and without retrieving any information from the server. For example, the information of the first peripheral device may be already stored in the electronic device (e.g., device identity 344 of electronic device data 340, FIG. 3) from a previous connection establishment session. For example, the electronic device may be able to identify MAC address of the Bluetooth device associated with the first peripheral device, and the request to the server may include the obtained MAC address.

In some implementations, the electronic device receives (510) a confirmation in response to the contact establishment request from the server. The electronic device adds (510) the first device contact (e.g., "Headphones" 412, FIG. 4B) to a listing of social networking contacts (e.g., listing 430, FIG. 4B) for the social network user account (e.g., user account 401, FIG. 4B) in the user interface of the social network application.

When the contact establishment request is sent prior to retrieving identity information from the server, in some implementations, the confirmation in response to the contact establishment request is received simultaneously with the first identity information item of the first peripheral device from the server.

In some implementations, the confirmation is received prior to retrieving the first identity information item of the first peripheral device. After establishing the first device contact, the electronic device retrieves the first identity information item of the first peripheral device. The electronic device may add and present the retrieved first identity information item to the first device contact.

In some embodiments, an icon representing the first device contact is retrieved from the server based on the device information associated with the first peripheral device. For example, the image may encode the device type, manufacturer, device model, etc. of the first peripheral device, and the server optionally retrieves an icon reflecting the device type, manufacturer, device model of the first peripheral device and sends it to the electronic device for display.

In some implementations, retrieving (504), based on the encoded information, the first identity information item of the first peripheral device from the server hosting the social networking platform associated with the social networking application further comprises: retrieving (512) multiple identity information items corresponding to multiple peripheral devices including the first peripheral device based on the encoded information. In some implementations, the same encoded information can be used for multiple peripheral devices, e.g., multiple devices in a same packaged set, or same manufacturer, etc. In some implementations, after retrieving the multiple identity information items from the server, the electronic device sends a contact establishment request to the server for establishing the listing of sub-contacts corresponding to the multiple peripheral devices.

In some implementations, adding (510) the first device contact to a listing of social networking contacts for the social network user account in the user interface of the social network application further comprises: presenting (512) a listing of sub-contacts (e.g., sub-contact listing 446, FIG. 4C) under the first device contact (e.g., "Home Theater" 442, FIG. 4C) in the user interface of the social network application, each sub-contact corresponding to a respective one of the multiple peripheral devices. In some embodiments, after the multiple peripheral devices have been established as device contacts, the listing of sub-contacts is saved in the social networking application associated with the social network user, regardless of whether a device sub-contact is currently connected to the electronic device.

In some implementations, establishing (506) the wireless connection between the electronic device and the first peripheral device is in response to a selection (512) of a respective sub-contact (e.g., selection 448 of the speakers to connect, FIG. 4C) corresponding to the first peripheral device from the presented listing of sub-contacts by a user of the electronic device. In some implementations, the connection between a peripheral device associated with a sub-contact and the electronic device can be switched to a connection between another peripheral device associated with another sub-contact and the electronic device. The wireless connection can be established in response to a selection from the social network user on the user interface of the social networking application.

Figure 5C:
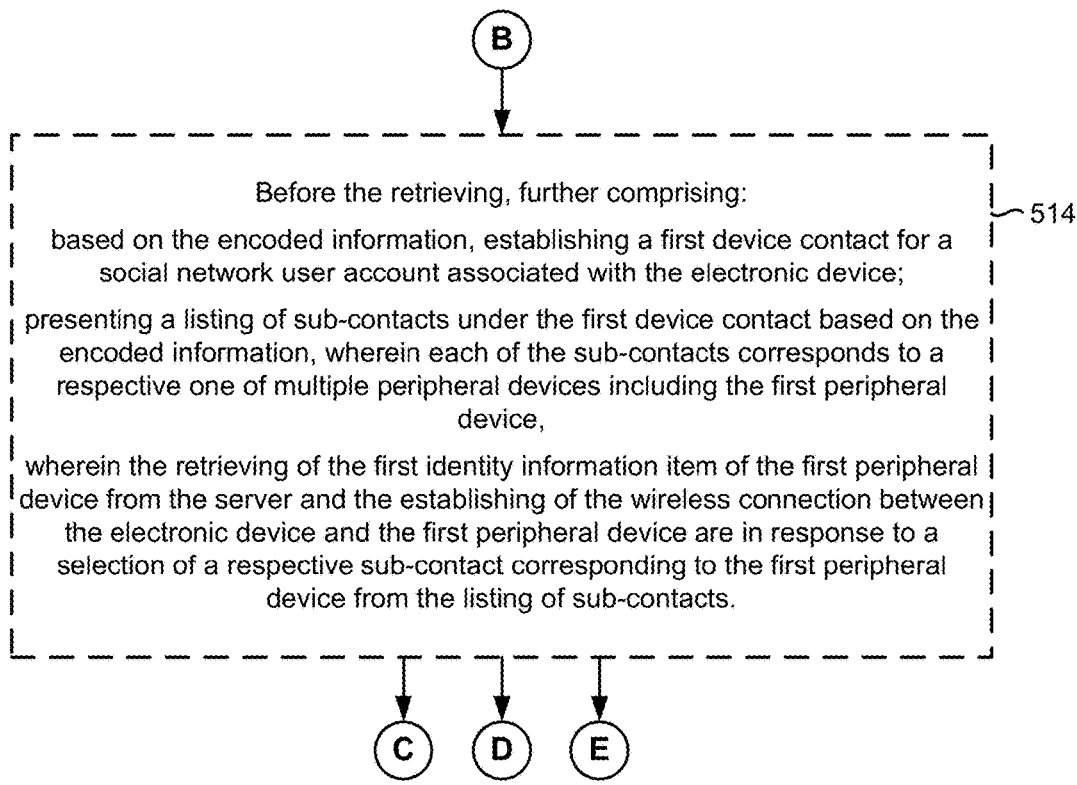
Figure 5C:
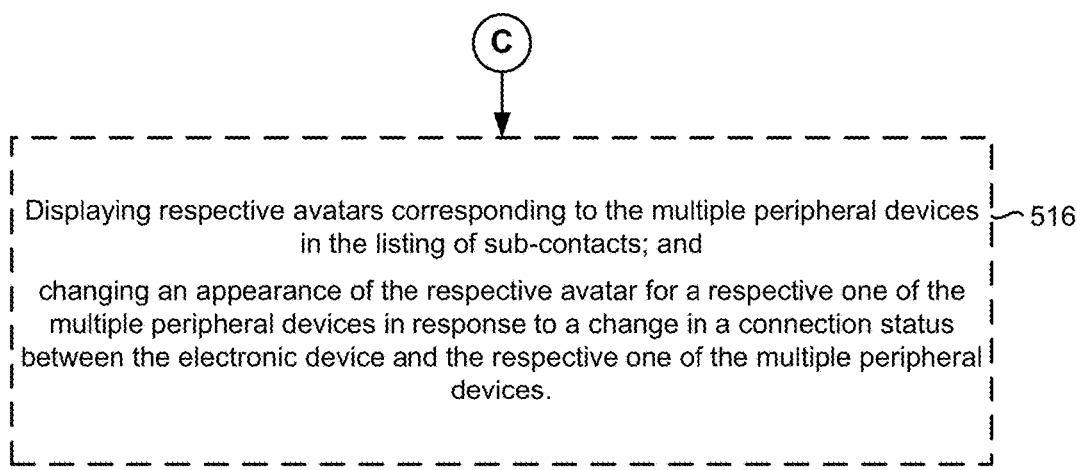

Referring to FIG. 5C, in some implementations, before the retrieving (504), based on the encoded information, method 500 further comprises: establishing (514) a first device contact for a social network user account associated with the electronic device; presenting (514) a listing of sub-contacts under the first device contact based on the encoded information. In some implementations, each of the sub-contacts corresponds (514) to a respective one of multiple peripheral devices including the first peripheral device. In some implementations, the retrieving of the first identity information item of the first peripheral device from the server and the establishing of the wireless connection between the electronic device and the first peripheral device are in response to a selection (514) of a respective sub-contact corresponding to the first peripheral device from the listing of sub-contacts.

In such implementations, before retrieving identity information items from the server, the electronic device identifies that the scanned image corresponds to multiple peripheral devices. For example, by sending the scanned image to the server, the electronic device is notified by the server of which multiple devices the scanned image may correspond to. Alternatively, the information encoded in the image can be deciphered by the electronic device locally, and tells the electronic device that it can correspond to multiple peripheral devices.

The electronic device then sends a contact establishment request to the server to establish a device contact including a listing of sub-contacts corresponding to the multiple peripheral devices. The scanning of the image can be used to trigger as a request for establishing a device contact (including zero or more sub-contacts) to the server. In response to the request, the server may establish a general (first) device contact that includes zero or more sub-contacts to represent each of zero or more peripheral devices associated with the image.

If there are multiple peripheral devices that may be represented by the general device contact, the user can select which of the multiple peripheral device is the one to which the user wishes to establish a connection (e.g., selection 448 of the speakers to connect, FIG. 4C). After the selection, any communication between the user and the selected peripheral device can then be transmitted by the server as messages between the user account and the first device account. After the selection, the electronic device also receives the information for establishing the connection with the selected peripheral device. The electronic device then uses the received information to request a confirmation from the selected peripheral device. Once a confirmation is received, the connection is established.

In some implementations, the electronic device displays (516) respective avatars (as shown in FIGS. 4C-4E) corresponding to the multiple peripheral devices in the listing of sub-contacts. The electronic device changes (516) an appearance of the respective avatar for a respective one of the multiple peripheral devices in response to a change in a connection status between the electronic device and the respective one of the multiple peripheral devices.

In some implementations, the first device contact represents a group contact including the listing of the sub-contacts. In some implementations, in addition to the identity information items, the electronic device also retrieves respective avatars representing the multiple peripheral devices based on the device identity information items. The electronic device presents the respective avatars to represent the peripheral devices in the listing of sub-contacts. When the user selects a particular peripheral device by selecting the respective avatar of the particular peripheral device from the listing of sub-contacts, a connection is established between the electronic device and the particular peripheral device selected by the user. When the connection is established, the avatar of the particular peripheral device can be displayed in a way that visually distinguishes it from other peripheral devices that are not currently connected to the electronic device. For example, the avatars of the connected peripheral devices can be shown in color, while the avatars of the unconnected peripheral devices can be grayed out. In some embodiments, more than one peripheral device may be connected at the same time, and the user may manually select a particular one of the connected peripheral device from the listing to send a text message or check on the status of the selected peripheral device.

Referring to FIG. 5D, in some implementations, the electronic device establishes (518) more than one wireless connection with more than one peripheral device from the multiple peripheral devices. The electronic device prepares (518) a message from the social network user account as shown as an example in FIG. 4D. In some implementations, the message may be a text message, or an audio message. The electronic device selects (518) a respective one of the sub-contacts for sending the message to a corresponding peripheral device of the selected respective one of the sub-contacts. The electronic device sends (518) the message to the server for conversion into a device-readable message for the corresponding peripheral device of the selected respective one of the sub-contacts.

In some embodiments, the server hosting the social networking platform converts the message into the device-readable message to be handled by the corresponding selected peripheral device. In some embodiments, the server forwards the message to an external server (e.g., machine server 122, FIG. 1) associated with manufacturer of the wireless communication device and/or the corresponding selected peripheral device for message conversion. Depending on the device types, models, manufacturers of the multiple peripheral devices, the device-readable messages received from the server may be different for the same message composed by the user.

In some implementations, before sending the message to the server for conversion, the electronic device detects (520) whether a wireless connection between the electronic device and the corresponding selected peripheral device is active.

In some implementations, the electronic device selects (522) one of the sub-contacts for sending a message to a corresponding peripheral device, as shown as an example in FIG. 4E. The electronic device then selects (522) a message input format based on the corresponding selected peripheral device. The electronic device prepares (522) a message in the message input format to be sent to the corresponding selected peripheral device.

In some implementations, the selection (522) of the message format may be performed by the user manually, e.g., from a listing of available formats. In some embodiments, the listing of available formats for each peripheral device may be different depending on the capabilities of the peripheral devices. The electronic device may obtain the information on the capabilities of each peripheral device (e.g., from the server or from the encoded message), and determines which message formats are suitable for the peripheral device. For example, if the peripheral device is a heart rate monitor, the message format may be textual or speech; if the peripheral device is a media player, the message format may be textual, speech, image, video, or sound.

FIG. 6A-6D are schematic flowcharts of methods of establishing wireless connections in accordance with some embodiments.

Figure 6A:
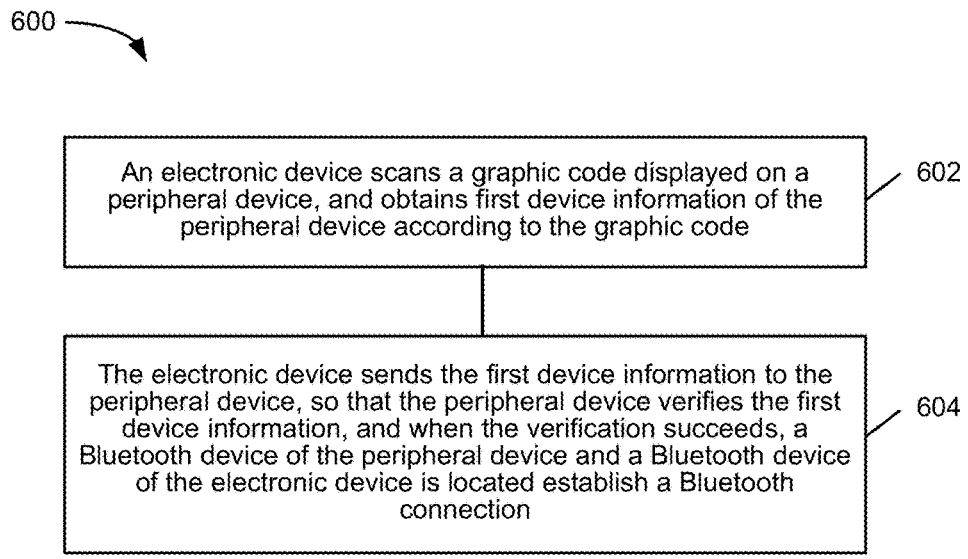
FIG. 6A-6D are schematic flowcharts of a method for establishing wireless connections in accordance with some embodiments.

Referring to FIG. 6A, method 600 comprise: scanning (602) a graphic code displayed by peripheral device, and obtains first device information of the peripheral device according to the graphic code, where the first device information includes second device information of a Bluetooth device of the peripheral device.

In some implementations, the first device information of the peripheral device may be a device identity (for example, a device ID) of the peripheral device, a Bluetooth address (for example, media access control (MAC)) of the Bluetooth device of the peripheral device or a device identity and a Bluetooth address of the peripheral device. The device identity may be a unique identity of the peripheral device, and the Bluetooth address may be a unique address of the Bluetooth device. The second device information of the Bluetooth device may be an address of the Bluetooth device or a device identity.

Method 600 further comprise sending (604) the first device information to the peripheral device, so that the peripheral device verifies the first device information, and when the verification succeeds, the Bluetooth device of the peripheral device and a Bluetooth device of the electronic device establish a Bluetooth connection.

In some implementations, the electronic device may send the first device information to another electronic device that is logged in to in the peripheral device. For example, the electronic device is an instant messaging electronic device, and then, in Step 604, the first device information may be sent between instant messaging electronic devices. After the electronic device that is logged in to in the peripheral device receives the first device information, the Bluetooth device of the peripheral device may be invoked to establish a Bluetooth connection with the Bluetooth device of the electronic device. In addition, the electronic device may send, by using the Bluetooth device, the first device information to the Bluetooth device of the peripheral device. Moreover, after receiving the first device information, the peripheral device may verify the received first device information. For example, it is verified whether the received first device information is device information of the peripheral device, if yes, the verification succeeds, and if not, the verification fails. When the verification succeeds, the Bluetooth device of the peripheral device may establish a Bluetooth connection with the Bluetooth device of the electronic device.

In the foregoing technical solution, an electronic device can scan a graphic code to obtain first device information, where the first device information includes second device information of a Bluetooth device of a peripheral device. The electronic device then sends the first device information to the peripheral device, and the peripheral device may verify the first device information. When the verification succeeds, the Bluetooth device of the peripheral device establishes a Bluetooth connection with a Bluetooth device of the electronic device. In this technical solution, a Bluetooth connection can be accomplished without receiving password information input by a user, thereby improving Bluetooth connection efficiency.

Figure 6B:
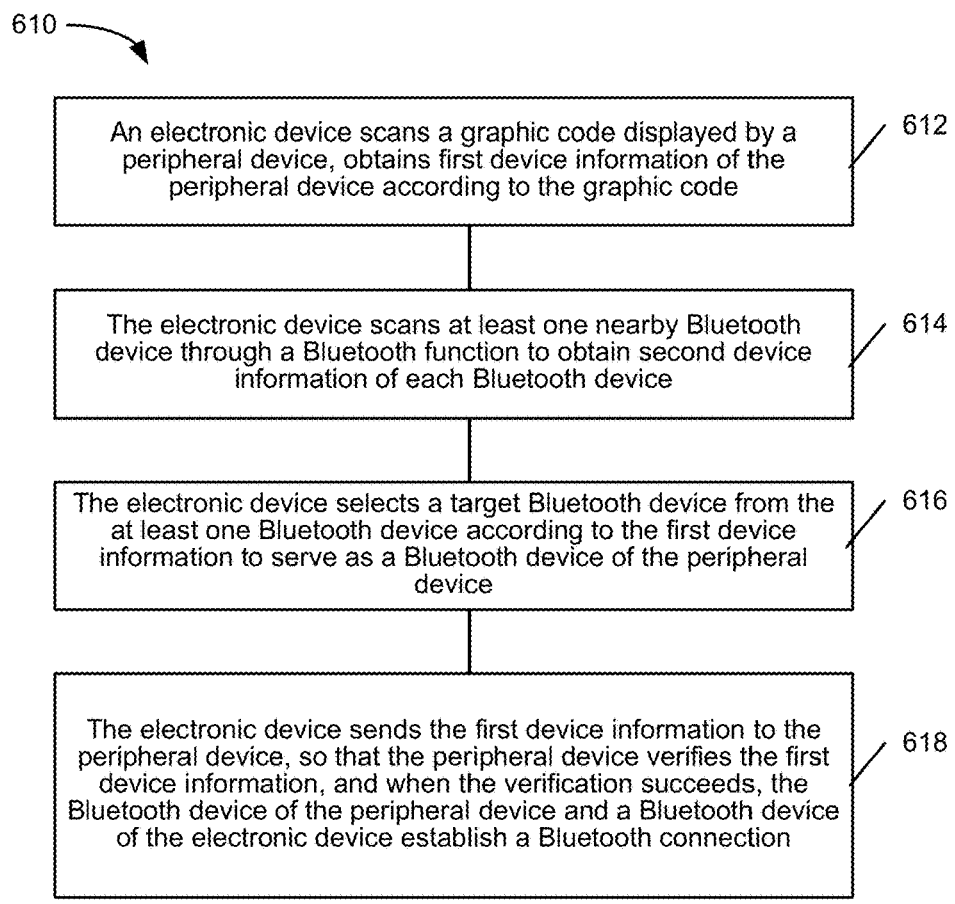

Referring to FIG. 6B, method 610 includes scanning (612) a graphic code displayed by a peripheral device, and obtains first device information of the peripheral device according to the graphic code, where the first device information includes second device information of a Bluetooth device of the peripheral device.

In some embodiments, the first device information of the peripheral device may be a device identity (for example, a device ID) of the peripheral device, a Bluetooth address (for example, MAC) of the Bluetooth device of the peripheral device or a device identity and a Bluetooth address of the peripheral device. The device identity may be a unique identity of the peripheral device, and the Bluetooth address may be a unique address of the Bluetooth device.

The electronic device scans (614) at least one nearby Bluetooth device through a Bluetooth function to obtain second device information of each Bluetooth device. In some embodiments, the electronic device may scan the at least one nearby Bluetooth device by invoking a Bluetooth function of a Bluetooth interface. The second device information of the Bluetooth device may be an address of the Bluetooth device or a device identity of the peripheral device.

The electronic device selects (616) a target Bluetooth device from the at least one Bluetooth device according to the first device information to serve as the Bluetooth device of the peripheral device, where the first device information includes second device information of the target Bluetooth device.

In some embodiments, because step 616 is to search for the Bluetooth device of the peripheral device, the electronic device finds a Bluetooth device whose second device information is included in the first device information of the peripheral device, and the target Bluetooth device is used as the Bluetooth device of the peripheral device. The target Bluetooth device may further be represented by a Bluetooth device whose second device information is included in the first device information of the peripheral device. For example, the first device information includes the Bluetooth address of the Bluetooth device of the peripheral device and the device identity of the peripheral device, and when the second device information of the target Bluetooth device includes the Bluetooth address or the device identity, the first device information includes the Bluetooth address or the device identity of the target Bluetooth device.

The electronic device sends (618) the first device information to the peripheral device, so that the peripheral device verifies the first device information, and when the verification succeeds, the Bluetooth device of the peripheral device and a Bluetooth device of the electronic device establish a Bluetooth connection.

In some embodiments, the electronic device may send, by using the Bluetooth device, the first device information to the Bluetooth device of the peripheral device. Moreover, after receiving the first device information, the peripheral device may verify the received first device information. For example, it is verified whether the received first device information is device information of the peripheral device, if yes, the verification succeeds, and if not, the verification fails. When the verification succeeds, the Bluetooth device of the peripheral device may establish a Bluetooth connection with the Bluetooth device of the electronic device.

Figure 6C:
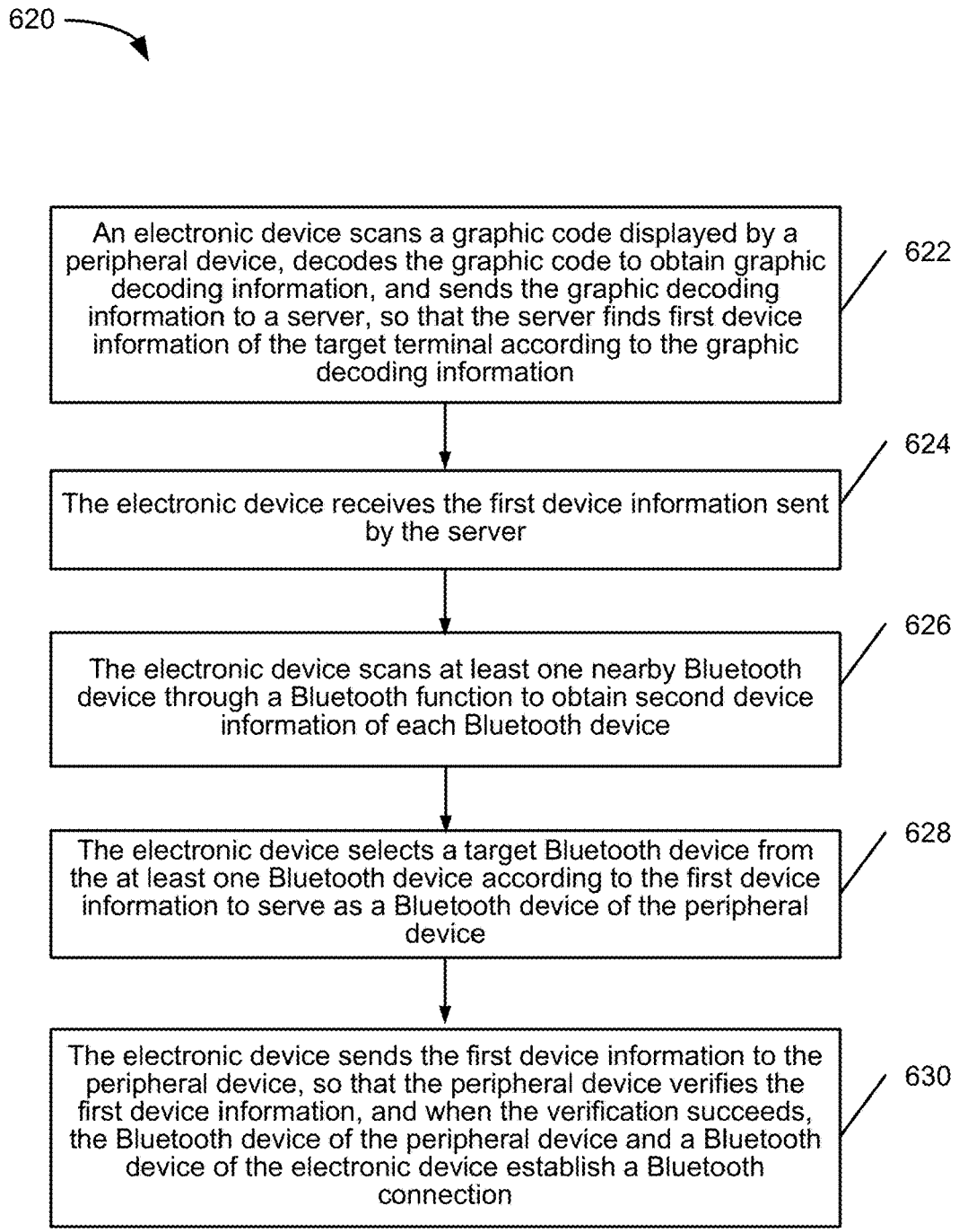

Referring to FIG. 6C, method 620 includes: scanning (622) a graphic code displayed by a peripheral device, decoding the graphic code to obtain graphic decoding information, and sends the graphic decoding information to a server, so that the server finds first device information of the peripheral device according to the graphic decoding information, where the first device information includes second device information of a Bluetooth device of the peripheral device.

In some embodiments, the graphic code displayed by the peripheral device may be sent by the server. In addition, the graphic decoding information of the graphic code may be information created by the server in advance and having a correspondence with the first device information of the peripheral device, that is, the server can find the first device information of the peripheral device by using the graphic decoding information, for example, the server can find a device identity and/or a Bluetooth address of the peripheral device by using the graphic decoding information. Moreover, the graphic decoding information may be specifically a string of character information.

In some embodiments, the graphic code displayed by the peripheral device may be a graphic code displayed by a electronic device; for example, when the electronic device executing Step 622 is an instant messaging electronic device, the peripheral device may also display the graphic code by using an instant messaging electronic device in the peripheral device.

The electronic device receives (624) the first device information sent by the server. The electronic device scans (626) at least one nearby Bluetooth device through a Bluetooth function to obtain second device information of each Bluetooth device.

In some embodiments, after receiving the first device information, the electronic device invokes a Bluetooth device of the electronic device, and scans, by using the Bluetooth device, the at least one nearby Bluetooth device to obtain the second device information of each Bluetooth device.

The electronic device selects (628) a target Bluetooth device from the at least one Bluetooth device according to the first device information to serve as the Bluetooth device of the peripheral device, where the first device information includes second device information of the target Bluetooth device.

The electronic device sends (630) the first device information to the peripheral device, so that the peripheral device verifies the first device information, and when the verification succeeds, the Bluetooth device of the peripheral device and the Bluetooth device of the electronic device establish a Bluetooth connection.

In some embodiments, when the first device information includes the Bluetooth address, for example, the first device information is the Bluetooth address and the device identity or the first device information is the Bluetooth address, Step 626 may includes: scanning, by the electronic device, the at least one nearby Bluetooth device through a Bluetooth function to obtain a Bluetooth address of each Bluetooth device.

Step 628 may include: selecting, by the electronic device from the at least one Bluetooth device according to the first device information, a Bluetooth device whose Bluetooth address is the Bluetooth address included by the first device information as the Bluetooth device of the peripheral device.

Step 630 may include: sending, by the electronic device, the Bluetooth address to the peripheral device, so that the peripheral device verifies the Bluetooth address, and when the verification succeeds, the Bluetooth device of the peripheral device and the Bluetooth device of the electronic device establish a Bluetooth connection.

In this implementation manner, a Bluetooth address may be directly used to establish a Bluetooth connection between devices. Because a password input by a user does not need to be received, Bluetooth connection efficiency may be improved. In addition, this implementation manner may be implemented in a device based on an Android system, that is, the device in which the electronic device executing Step 622 to Step 630 and the peripheral device may be devices based on an Android system.

In some embodiments, when the first device information includes a Bluetooth address and/or a device identity, Step 626 may include: scanning, by the electronic device, at least one nearby Bluetooth device through a Bluetooth function to obtain broadcast information of each Bluetooth device, where broadcast information of a Bluetooth device includes second device information of the Bluetooth device; and obtaining, by the electronic device, second device information of each Bluetooth device separately from the broadcast information of each Bluetooth device, where the second device information includes the Bluetooth address or the device identity.

In some embodiments, the broadcast information may be information sent by a Bluetooth device in broadcast mode, and may also be a name of a Bluetooth device, that is, the name of the Bluetooth device may carry the second device information. In addition, the broadcast information may also be information defined by a device manufacturer; for example, the broadcast information includes a device identity of a Bluetooth device. In this way, the electronic device may directly extract second device information of a Bluetooth device from broadcast information of the Bluetooth device.

It should be noted that this implementation manner may be implemented in both a device based on an Android system and a device based on an iOS system. During implementation in a device based on an iOS system, the Bluetooth device may be a Bluetooth low energy (BLE) device, for example, a Bluetooth device of the Bluetooth 4.0 specification. In some embodiments, the broadcast information may further be information encapsulated by using a protocol; for example, the broadcast information may be information encapsulated by using an iAP protocol used by an iOS system. The step of obtaining, by the electronic device, second device information of each Bluetooth device separately from the broadcast information of each Bluetooth device may include: performing, by the electronic device, protocol decapsulation separately on the broadcast information of each Bluetooth device to obtain the second device information of each Bluetooth device.

The second device information may include a device identity; for example, the second device information of the target Bluetooth device includes the device identity of the peripheral device. In addition, the second device information may further include device manufacturer information, hardware version information, software version information, and the like.

It should be noted that this implementation manner may be implemented in a device based on an iOS system; for example, the Bluetooth device may be a classic Bluetooth device (for example, a Bluetooth device of the Bluetooth 2.0 specification).

In some embodiments, in another embodiment, the electronic device may further obtain the first device information of the peripheral device by scanning, by the electronic device, the graphic code displayed by the peripheral device, decoding the graphic code to obtain the graphic decoding information, and using the graphic decoding information as the first device information of the peripheral device.

The graphic decoding information of the graphic code displayed by the peripheral device is the first device information of the peripheral device, that is, in this implementation manner, the electronic device may directly decode the graphic code displayed by the peripheral device to obtain the first device information of the peripheral device. In this implementation manner, participation of a server is not needed, thereby saving network resources. In the foregoing technical solution, on the basis of the first embodiment, multiple optional implementation manners are added, all of which can improve Bluetooth connection efficiency.

Figure 6D:
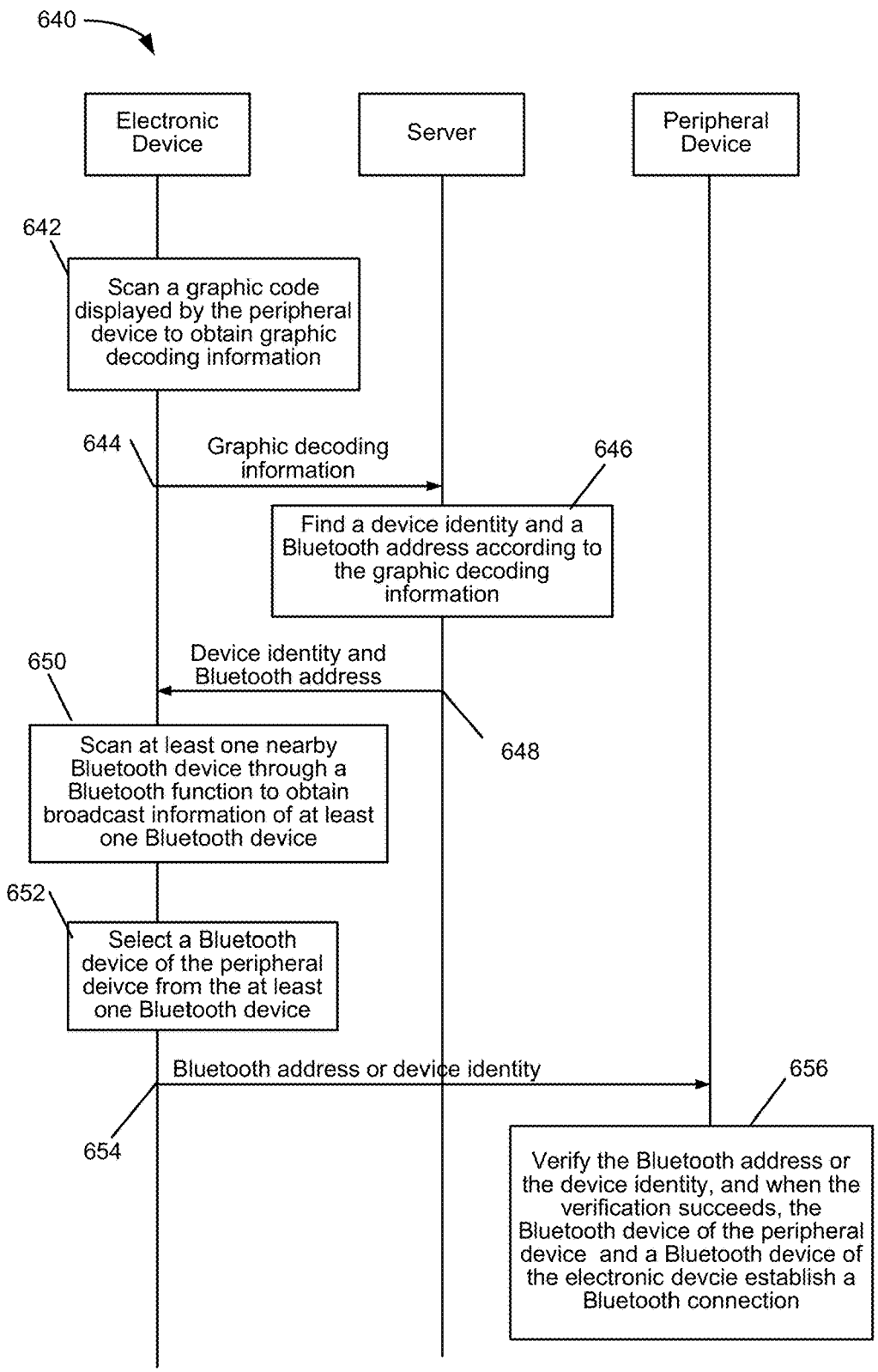

Referring to FIG. 6D, method 640 includes scanning (642), by an electronic device, a graphic code displayed by a peripheral device to obtain graphic decoding information. The electronic device sends (644) the graphic decoding information to a server. The server finds (646) a device identity and a Bluetooth address that correspond to the graphic decoding information, where the device identity and the Bluetooth address are respectively a device identity of the peripheral device and an address of a Bluetooth device of the peripheral device. The server sends (648) the device identity and the Bluetooth address to the electronic device. The electronic device scans (650) at least one nearby Bluetooth device through a Bluetooth function to obtain broadcast information of at least one Bluetooth device. The electronic device selects (652), from the at least one Bluetooth device, a Bluetooth device whose broadcast information includes a Bluetooth address or a device identity same as the Bluetooth address and the device identity that are sent by the server as a Bluetooth device of the peripheral device. The electronic device sends (654) the Bluetooth address or the device identity of the peripheral device to the peripheral device. The peripheral device verifies (656) the Bluetooth address or the device identity sent by the electronic device, and when the Bluetooth address sent by the electronic device is the Bluetooth address of the Bluetooth device of the peripheral device or when the device identity sent by the electronic device is the device identity of the peripheral device, the Bluetooth device of the peripheral device and a Bluetooth device of the electronic device establish a Bluetooth connection.

Figure 6E:
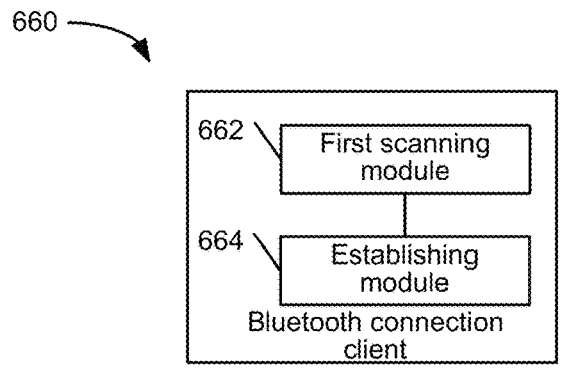
FIG. 6E-6G are block diagram illustrating exemplary electronic devices in accordance with some embodiments.
Figure 6F:
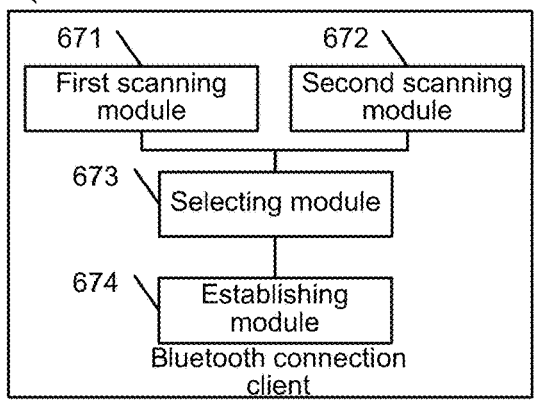
Figure 6G:
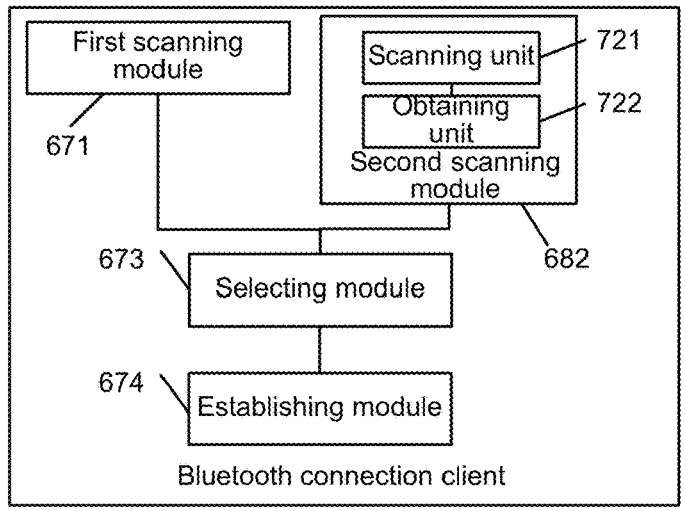

FIG. 6E-6G are block diagram illustrating exemplary embodiments of electronic devices in accordance with some embodiments. Referring to FIG. 6E, the electronic device includes: a first scanning module 662 and an establishing module 664.

The first scanning module 662 is used to scan a graphic code displayed by a peripheral device, and obtain first device information of the peripheral device according to the graphic code, where the first device information includes second device information of a Bluetooth device of the peripheral device. The second device information of the Bluetooth device may be an address of the Bluetooth device or a device identity.

The establishing module 664 is used to send the first device information to the peripheral device, so that the peripheral device verifies the first device information, and when the verification succeeds, the Bluetooth device of the peripheral device and a Bluetooth device of the electronic device establish a Bluetooth connection.

In some embodiments, the establishing module 664 may send the first device information to another electronic device that is logged in to in the peripheral device. For example, the electronic device is an instant messaging electronic device, and then the establishing module 664 may send the first device information between instant messaging electronic devices. After the electronic device that is logged in to in the peripheral device receives the first device information, the Bluetooth device of the peripheral device may be invoked to establish a Bluetooth connection with the Bluetooth device of the electronic device. In addition, the establishing module 664 may send the first device information to the Bluetooth device of the peripheral device by using Bluetooth. Moreover, after receiving the first device information, the peripheral device may verify the received first device information. For example, it is verified whether the received first device information is device information of the peripheral device, if yes, the verification succeeds, and if not, the verification fails. When the verification succeeds, the Bluetooth device of the peripheral device may establish a Bluetooth connection with the Bluetooth device of the electronic device.

Referring to FIG. 6F, the electronic device includes: a first scanning module 671, a second scanning module 672, a selecting module 673, and an establishing module 674.

The first scanning module 671 is used to scan a graphic code displayed by a peripheral device, and obtain first device information of the peripheral device according to the graphic code, where the first device information includes second device information of a Bluetooth device of the peripheral device. The second scanning module 672 is used to scan at least one nearby Bluetooth device through a Bluetooth function to obtain second device information of each Bluetooth device. In some embodiments, the second scanning module 62 may scan the at least one nearby Bluetooth device by invoking a Bluetooth function of a Bluetooth interface. In addition, the second device information of the Bluetooth device may be an address of the Bluetooth device or the second device information of the Bluetooth device may be a device identity of the electronic device.

The selecting module 673 is used to select a target Bluetooth device from the at least one Bluetooth device according to the first device information to serve as the Bluetooth device of the peripheral device, where the first device information includes second device information of the target Bluetooth device. The establishing module 674 is used to send the first device information to the peripheral device, so that the peripheral device verifies the first device information, and when the verification succeeds, the Bluetooth device of the peripheral device and a Bluetooth device of the electronic device establish a Bluetooth connection.

In some embodiments, as shown in the electronic device 680 FIG. 6G, when the first device information includes the Bluetooth address and/or the device identity, the second scanning module 682 may include: a scanning unit 721, used to scan the at least one nearby Bluetooth device through a Bluetooth function to obtain broadcast information of each Bluetooth device, where broadcast information of a Bluetooth device includes second device information of the Bluetooth device; and an obtaining unit 722, used to obtain second device information of each Bluetooth device separately from the broadcast information of each Bluetooth device, where the second device information includes a Bluetooth address or a device identity. The first scanning module 671, the selecting module 673, and the establishing module 674 are substantially similar to those described in FIG. 6F.

In some embodiments, the broadcast information may be information sent by a Bluetooth device in broadcast mode, and may also be a name of a Bluetooth device, that is, the name of the Bluetooth device may carry the second device information. In addition, the broadcast information may also be information defined by a device manufacturer; for example, the broadcast information includes a device identity. In this way, the electronic device may directly extract second device information of a Bluetooth device from broadcast information of the Bluetooth device. It should be noted that this implementation manner may be implemented in both a device based on an Android system and a device based on an iOS system. During implementation in a device based on an iOS system, the Bluetooth device may be a BLE device, for example, a Bluetooth device of the Bluetooth 4.0 specification. In some embodiments, the broadcast information may further be information encapsulated by using a protocol; for example, the broadcast information may be information encapsulated by using an iAP protocol used by an iOS system. The obtaining unit 722 performs protocol decapsulation separately on the broadcast information of each Bluetooth device to obtain the second device information of each Bluetooth device.

The second device information may include a device identity; for example, the second device information of the target Bluetooth device includes the device identity of the peripheral device. In addition, the second device information may further include device manufacturer information, hardware version information, software version information, and the like. It should be noted that this implementation manner may be implemented in a device based on an iOS system; for example, the Bluetooth device may be a classic Bluetooth device (for example, a Bluetooth device of the Bluetooth 2.0 specification). In some embodiments, the first scanning module 671 may be further used to scan the graphic code displayed by the peripheral device, decode the graphic code to obtain the graphic decoding information, and use the graphic decoding information as the first device information of the peripheral device.

In some embodiments, the graphic decoding information of the graphic code displayed by the peripheral device is the first device information of the peripheral device, that is, in this implementation manner, the electronic device may directly decode the graphic code displayed by the peripheral device to obtain the first device information of the peripheral device. In this implementation manner, participation of a server is not needed, thereby saving network resources.

Each of the methods described herein is typically governed by instructions that are stored in a computer readable storage medium and that are executed by one or more processors of one or more servers or electronic devices. The above identified modules or programs (i.e., sets of instructions) need not be implemented as separate software programs, procedures or modules, and thus various subsets of these modules will be combined or otherwise re-arranged in various embodiments.

The foregoing description, for purpose of explanation, has been described with reference to specific embodiments. However, the illustrative discussions above are not intended to be exhaustive or to limit the disclosed technology to the precise forms disclosed. Many modifications and variations are possible in view of the above teachings. The embodiments were chosen and described in order to best explain the principles of the disclosed technology and its practical applications, to thereby enable others skilled in the art to best utilize the disclosed technology and various embodiments with various modifications as are suited to the particular use contemplated.

What is claimed is:

1. A method for connecting devices, comprising:
   at an electronic device having one or more processors and memory:
      scanning, through a user interface of a social networking application, an image containing encoded information associated with a first peripheral device that provides a first wireless communication interface;
      retrieving, based on the encoded information, a first identity information item of the first peripheral device from a server hosting a social networking platform associated with the social networking application;
      in accordance with the retrieved first identity information item, establishing a wireless connection between the electronic device and the first peripheral device via the first wireless communication interface of the first peripheral device; and
   sending a contact establishment request to the server to establish a first device contact for a social network user account associated with the electronic device to represent at least the first peripheral device, wherein the contact establishment request includes one or more of:
      the image,
      the encoded information, and
      device information of the first peripheral device identified by the electronic device from the image.

2. The method of claim 1, further comprising:
   receiving a confirmation in response to the contact establishment request from the server; and adding the first device contact to a listing of social networking contacts for the social network user account in the user interface of the social network application.

3. The method of claim 2, wherein retrieving, based on the encoded information, the first identity information item of the first peripheral device from the server hosting the social networking platform associated with the social networking application further comprises:
  based on the encoded information, retrieving multiple identity information items corresponding to multiple peripheral devices including the first peripheral device;
  wherein adding the first device contact to a listing of social networking contacts for the social network user account in the user interface of the social network application further comprises:
  presenting a listing of sub-contacts under the first device contact in the user interface of the social network application, each sub-contact corresponding to a respective one of the multiple peripheral devices; and
  wherein establishing the wireless connection between the electronic device and the first peripheral device is in response to a selection of a respective sub-contact corresponding to the first peripheral device from the presented listing of sub-contacts by a user of the electronic device.

4. The method of claim 3, further comprising:
  displaying respective avatars corresponding to the multiple peripheral devices in the listing of sub-contacts; and
  changing an appearance of the respective avatar for a respective one of the multiple peripheral devices in response to a change in a connection status between the electronic device and the respective one of the multiple peripheral devices.

5. The method of claim 3, further comprising:
  establishing more than one wireless connection with more than one peripheral device from the multiple peripheral devices;
  preparing a message from the social network user account;
  selecting a respective one of the sub-contacts for sending the message to a corresponding peripheral device of the selected respective one of the sub-contacts; and
  sending the message to the server for conversion into a device-readable message for the corresponding peripheral device of the selected respective one of the sub-contacts.

6. The method of claim 5, before sending the message to the server for conversion, further comprising:
  detecting whether a wireless connection between the electronic device and the corresponding selected peripheral device is active.

7. The method of claim 3, further comprising:
  selecting one of the sub-contacts for sending a message to a corresponding peripheral device;
  selecting a message input format based on the corresponding selected peripheral device; and
  preparing a message in the message input format to be sent to the corresponding selected peripheral device.

8. The method of claim 1, before the retrieving, further comprising:
  based on the encoded information, establishing a first device contact for a social network user account associated with the electronic device; and
  presenting a listing of sub-contacts under the first device contact based on the encoded information, wherein each of the sub-contacts corresponds to a respective one of multiple peripheral devices including the first peripheral device, and
  wherein the retrieving of the first identity information item of the first peripheral device from the server and the establishing of the wireless connection between the electronic device and the first peripheral device are in response to a selection of a respective sub-contact corresponding to the first peripheral device from the listing of sub-contacts.

9. An electronic device, comprising:
one or more processors; and
memory storing one or more programs to be executed by the one or more processors, the one or more programs comprising instructions for:
  scanning, through a user interface of a social networking application, an image containing encoded information associated with a first peripheral device that provides a first wireless communication interface;
  retrieving, based on the encoded information, a first identity information item of the first peripheral device from a server hosting a social networking platform associated with the social networking application;
  in accordance with the retrieved first identity information item, establishing a wireless connection between the electronic device and the first peripheral device via the first wireless communication interface of the first peripheral device; and
  sending a contact establishment request to the server to establish a first device contact for a social network user account associated with the electronic device to represent at least the first peripheral device, wherein the contact establishment request includes one or more of:
    the image,
    the encoded information, and
    device information of the first peripheral device identified by the electronic device from the image.

10. The electronic device of claim 9, wherein the one or more programs further comprise instructions for:
  receiving a confirmation in response to the contact establishment request from the server; and
  adding the first device contact to a listing of social networking contacts for the social network user account in the user interface of the social network application.

11. The electronic device of claim 10, wherein retrieving, based on the encoded information, the first identity information item of the first peripheral device from the server hosting the social networking platform associated with the social networking application further comprises:
  based on the encoded information, retrieving multiple identity information items corresponding to multiple peripheral devices including the first peripheral device;
  wherein adding the first device contact to a listing of social networking contacts for the social network user account in the user interface of the social network application further comprises:
  presenting a listing of sub-contacts under the first device contact in the user interface of the social network application, each sub-contact corresponding to a respective one of the multiple peripheral devices; and
  wherein establishing the wireless connection between the electronic device and the first peripheral device is in response to a selection of a respective sub-contact corresponding to the first peripheral device from the presented listing of sub-contacts by a user of the electronic device.

12. The electronic device of claim 11, wherein the one or more programs further comprise instructions for:
- displaying respective avatars corresponding to the multiple peripheral devices in the listing of sub-contacts; and
- changing an appearance of the respective avatar for a respective one of the multiple peripheral devices in response to a change in a connection status between the electronic device and the respective one of the multiple peripheral devices.

13. The electronic device of claim 9, before the retrieving, wherein the one or more programs further comprise instructions for:
- based on the encoded information, establishing a first device contact for a social network user account associated with the electronic device; and
- presenting a listing of sub-contacts under the first device contact based on the encoded information, wherein each of the sub-contacts corresponds to a respective one of multiple peripheral devices including the first peripheral device, and
- wherein the retrieving of the first identity information item of the first peripheral device from the server and the establishing of the wireless connection between the electronic device and the first peripheral device are in response to a selection of a respective sub-contact corresponding to the first peripheral device from the listing of sub-contacts.

14. A non-transitory computer readable storage medium storing one or more programs, the one or more programs comprising instructions, which, when executed by an electronic device with one or more processors, cause the electronic device to perform operations comprising:
- scanning, through a user interface of a social networking application, an image containing encoded information associated with a first peripheral device that provides a first wireless communication interface;
- retrieving, based on the encoded information, a first identity information item of the first peripheral device from a server hosting a social networking platform associated with the social networking application;
- in accordance with the retrieved first identity information item, establishing a wireless connection between the electronic device and the first peripheral device via the first wireless communication interface of the first peripheral device; and
- sending a contact establishment request to the server to establish a first device contact for a social network user account associated with the electronic device to represent at least the first peripheral device, wherein the contact establishment request includes one or more of:
  - the image,
  - the encoded information, and
  - device information of the first peripheral device identified by the electronic device from the image.

15. The non-transitory computer readable storage medium of claim 14, wherein the one or more programs further comprise instructions which cause the electronic device to perform operations comprising:
- receiving a confirmation in response to the contact establishment request from the server; and
- adding the first device contact to a listing of social networking contacts for the social network user account in the user interface of the social network application.

16. The non-transitory computer readable storage medium of claim 15, wherein retrieving, based on the encoded information, the first identity information item of the first peripheral device from the server hosting the social networking platform associated with the social networking application further comprises:
- based on the encoded information, retrieving multiple identity information items corresponding to multiple peripheral devices including the first peripheral device;
- wherein adding the first device contact to a listing of social networking contacts for the social network user account in the user interface of the social network application further comprises:
  - presenting a listing of sub-contacts under the first device contact in the user interface of the social network application, each sub-contact corresponding to a respective one of the multiple peripheral devices; and
- wherein establishing the wireless connection between the electronic device and the first peripheral device is in response to a selection of a respective sub-contact corresponding to the first peripheral device from the presented listing of sub-contacts by a user of the electronic device.

17. The non-transitory computer readable storage medium of claim 14, wherein the one or more programs further comprise instructions which cause the electronic device to perform operations comprising:
- based on the encoded information, establishing a first device contact for a social network user account associated with the electronic device; and
- presenting a listing of sub-contacts under the first device contact based on the encoded information, wherein each of the sub-contacts corresponds to a respective one of multiple peripheral devices including the first peripheral device, and
- wherein the retrieving of the first identity information item of the first peripheral device from the server and the establishing of the wireless connection between the electronic device and the first peripheral device are in response to a selection of a respective sub-contact corresponding to the first peripheral device from the listing of sub-contacts.

* * * * *